US011140140B2

(12) United States Patent
Norum

(10) Patent No.: US 11,140,140 B2
(45) Date of Patent: Oct. 5, 2021

(54) VIRTUAL CRYPTOGRAPHIC MODULE WITH LOAD BALANCER AND CRYPTOGRAPHIC MODULE FLEET

(71) Applicant: Amazon Technologies, Inc., Seattle, WA (US)

(72) Inventor: Steven Preston Lightner Norum, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 16/601,285

(22) Filed: Oct. 14, 2019

(65) Prior Publication Data

US 2020/0045028 A1    Feb. 6, 2020

Related U.S. Application Data

(63) Continuation of application No. 15/351,229, filed on Nov. 14, 2016, now Pat. No. 10,447,668.

(51) Int. Cl.
*H04L 29/06* (2006.01)
*G06F 21/60* (2013.01)
*H04L 9/08* (2006.01)
*H04L 9/32* (2006.01)

(52) U.S. Cl.
CPC ........ *H04L 63/0485* (2013.01); *G06F 21/602* (2013.01); *H04L 9/0897* (2013.01); *H04L 63/0471* (2013.01); *H04L 63/06* (2013.01); *H04L 9/3234* (2013.01); *H04L 2209/127* (2013.01)

(58) Field of Classification Search
CPC ... H04L 63/0485; H04L 9/0897; H04L 63/06; H04L 63/0471; H04L 2209/127; H04L 9/3234; G06F 21/602
See application file for complete search history.

(56) References Cited

U.S. PATENT DOCUMENTS

| 6,189,098 B1 | 2/2001 | Kaliski, Jr. |
| 7,484,089 B1 | 1/2009 | Kogen et al. |
| 8,296,434 B1 * | 10/2012 | Miller ................. H04L 67/1029 709/226 |
| 8,522,035 B2 | 8/2013 | Sherkin et al. |

(Continued)

OTHER PUBLICATIONS

Chieu et al., "Dynamic Scaling of Web Applications in a Virtualized Cloud Computing Environment," Oct. 2009, IEEE International Conference on e-Business Engineering, pp. 281-286.

(Continued)

*Primary Examiner* — James R Turchen
(74) *Attorney, Agent, or Firm* — Davis Wright Tremaine LLP

(57) ABSTRACT

A virtual cryptographic module is used to perform cryptographic operations. The virtual cryptographic module may include a fleet of cryptographic modules and a load balancer that determines when a cryptographic module should be added to or removed from the fleet. The fleet size may be adjusted based on detecting a set of conditions that includes the utilization level of the fleet. One or more cryptographic modules of the fleet may be used to fulfill requests to perform cryptographic operations. A cryptographic module may be a hardware security module ("HSM").

20 Claims, 12 Drawing Sheets

(56) References Cited

U.S. PATENT DOCUMENTS

| | | | |
|---|---|---|---|
| 8,694,781 B1* | 4/2014 | Griffin | G06F 21/566 |
| | | | 713/168 |
| 9,853,861 B2* | 12/2017 | Mazhar | H04L 41/0806 |
| 10,706,182 B2* | 7/2020 | Sion | H04L 9/3226 |
| 2005/0005161 A1* | 1/2005 | Baldwin | G06F 21/71 |
| | | | 726/26 |
| 2005/0120160 A1* | 6/2005 | Plouffe | G06F 9/4856 |
| | | | 711/1 |
| 2006/0093149 A1 | 5/2006 | Zhu et al. | |
| 2006/0256108 A1* | 11/2006 | Scaralata | G06F 9/45558 |
| | | | 345/418 |
| 2006/0262929 A1* | 11/2006 | Vatanen | H04L 63/0823 |
| | | | 380/255 |
| 2007/0016801 A1 | 1/2007 | Bade et al. | |
| 2007/0260545 A1* | 11/2007 | Bade | G06F 21/57 |
| | | | 705/51 |
| 2008/0008316 A1 | 1/2008 | Pilipchuk | |
| 2009/0055641 A1* | 2/2009 | Smith | G06F 9/45558 |
| | | | 713/100 |
| 2009/0169012 A1* | 7/2009 | Smith | H04L 9/0836 |
| | | | 380/277 |
| 2010/0161998 A1 | 6/2010 | Chen et al. | |
| 2011/0302417 A1* | 12/2011 | Whillock | H04L 63/08 |
| | | | 713/168 |
| 2012/0130874 A1* | 5/2012 | Mane | H04L 63/08 |
| | | | 705/34 |
| 2012/0210124 A1 | 8/2012 | Lieber | |
| 2012/0265976 A1 | 10/2012 | Spiers et al. | |
| 2013/0085880 A1 | 4/2013 | Roth et al. | |
| 2013/0129087 A1 | 5/2013 | Qi et al. | |
| 2013/0132717 A1 | 5/2013 | Brand et al. | |
| 2013/0219164 A1* | 8/2013 | Hamid | H04L 9/08 |
| | | | 713/150 |
| 2014/0089660 A1 | 3/2014 | Sarangshar et al. | |
| 2014/0095863 A1* | 4/2014 | Liu | G06F 21/84 |
| | | | 713/153 |
| 2014/0095865 A1 | 4/2014 | Yerra et al. | |
| 2014/0108825 A1 | 4/2014 | O'Loughlin et al. | |
| 2014/0172741 A1* | 6/2014 | Liu | G06F 21/606 |
| | | | 705/342 |
| 2014/0281483 A1* | 9/2014 | Vigliaturo | H04L 63/0471 |
| | | | 713/153 |
| 2014/0282936 A1* | 9/2014 | Fitzgerald | H04L 41/0809 |
| | | | 726/6 |
| 2015/0134953 A1* | 5/2015 | Seaborn | G06F 21/602 |
| | | | 713/168 |
| 2015/0270977 A1 | 9/2015 | Martins et al. | |
| 2015/0358161 A1* | 12/2015 | Kancharla | G06F 21/602 |
| | | | 713/164 |
| 2015/0358312 A1* | 12/2015 | Kancharla | H04L 63/0823 |
| | | | 713/156 |
| 2016/0092687 A1* | 3/2016 | Boenisch | G06F 9/45558 |
| | | | 713/2 |
| 2016/0119141 A1* | 4/2016 | Jing | H04L 9/3234 |
| | | | 713/156 |
| 2016/0149877 A1* | 5/2016 | Kancharla | H04L 9/3234 |
| | | | 713/171 |
| 2016/0277372 A1 | 9/2016 | Shah et al. | |
| 2017/0012774 A1 | 1/2017 | Antoni et al. | |
| 2017/0093812 A1* | 3/2017 | Schenk | G06F 21/6254 |
| 2017/0222981 A1 | 8/2017 | Srivastav et al. | |
| 2017/0249464 A1* | 8/2017 | Maximov | G06F 21/57 |
| 2017/0302656 A1 | 10/2017 | Ramatchandirane | |
| 2017/0351879 A1* | 12/2017 | Sion | H04L 9/00 |
| 2018/0004954 A1 | 1/2018 | Liguori et al. | |
| 2019/0095234 A1 | 3/2019 | Liguori et al. | |

OTHER PUBLICATIONS

Luo et al., "Virtualization security for cloud computing service," International Conference on Cloud and Service Computing, IEEE Dec. 2011, pp. 174-179.

NIST, "Implementation Guidance for FIPS PUB 140-1 and the Cryptographic Module Validation Program," Jan. 10, 2002, 63 pages.

NIST, "Implementation Guidance for FIPS PUB 140-2 and the Cryptographic Module Validation Program," Initial Release Mar. 28, 2003, 205 pages.

* cited by examiner

VIRTUAL CRYPTOGRAPHIC MODULE WITH LOAD BALANCER AND CRYPTOGRAPHIC MODULE FLEET

CROSS-REFERENCE TO RELATED APPLICATIONS

This application is a continuation of U.S. patent application Ser. No. 15/351,229, filed Nov. 14, 2016, issued as U.S. Pat. No. 10,447,668, entitled "VIRTUAL CRYPTOGRAPHIC MODULE WITH LOAD BALANCER AND CRYPTOGRAPHIC MODULE FLEET," the disclosure of which is incorporated herein by reference in its entirety. This application is also related to and incorporates by reference for all purposes the full disclosure of co-pending U.S. patent application Ser. No. 15/351,255, filed Nov. 14, 2016, issued as U.S. Pat. No. 10,461,943, entitled "TRANSPARENTLY SCALABLE VIRTUAL HARDWARE SECURITY MODULE."

BACKGROUND

Maintaining the security of computer systems is a difficult problem. One way that computer systems are secured, is through the use of cryptography. Cryptographic systems rely on cryptographic keys to protect information. In many situations the security of the cryptographic keys is of high importance, because access to the cryptographic keys allows access to the data that is being protected. One way cryptographic keys can be secured is through the use of a Hardware Security Module ("HSM"). An HSM is a physical computing device that safeguards cryptographic keys by storing them within a tamper-resistant physical device. HSMs provide cryptographic key generation and storage, and perform cryptographic operations for authorized clients of the HSM. Some cryptographic keys, called session keys, are associated with a particular connection from a particular HSM client, and are deleted as a result of termination of the session. Token keys are cryptographic keys that persist on the HSM, and that can be used by multiple users and sessions. In general, the cryptographic keys are not exportable from the HSM in an unprotected form.

In large-scale computing environments, the demand for cryptographic operations may exceed the capabilities of a single HSM. Simultaneously coordinating the use of multiple HSMs may be difficult for a client to manage, and the client may have difficulty determining how many HSMs are needed for a particular use case. Maintaining a fleet of HSMs can be difficult, because the non-exportability of the cryptographic keys makes it difficult to maintain a collection of synchronized cryptographic keys across the fleet.

BRIEF DESCRIPTION OF THE DRAWINGS

Various techniques will be described with reference to the drawings, in which.

DETAILED DESCRIPTION

Figure 1:
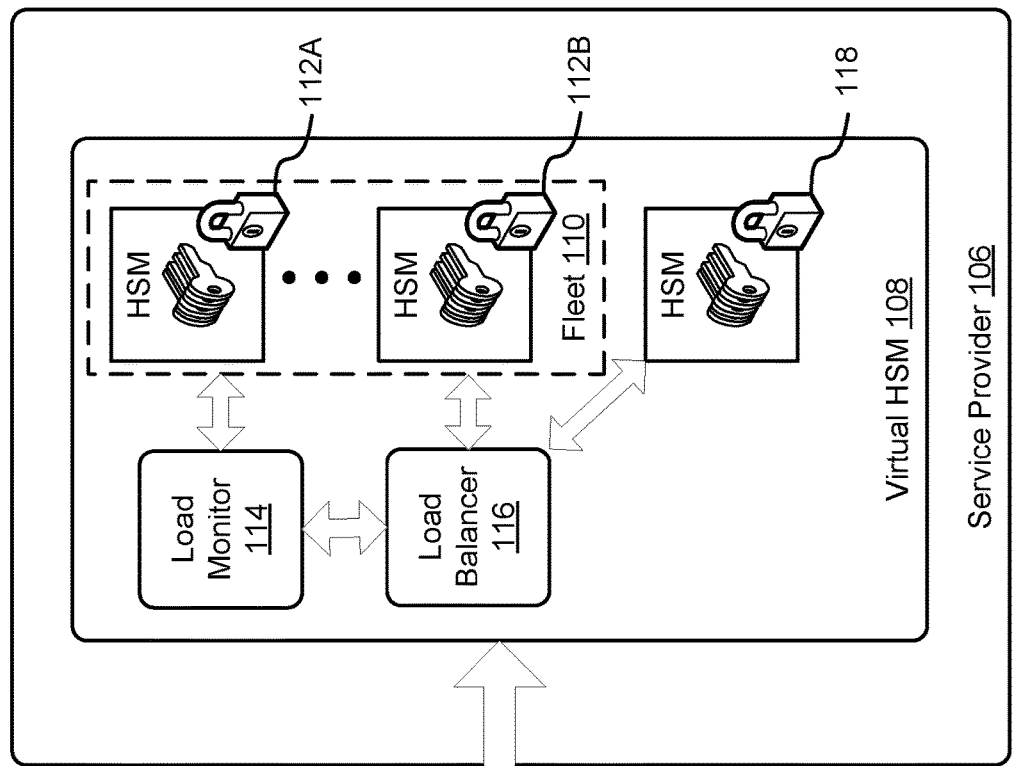
FIG. 1 shows an illustrative example of a client and virtual HSM.

This document describes techniques for presenting a client of a hardware security module (HSM) with a single functional HSM that can handle larger or smaller request loads with minimal resource wastage and no customer awareness or interaction. In general, a cryptographic module such as an HSM may be used to perform cryptographic operations such as encrypting data, decrypting data, and generating cryptographic keys. Cryptographic keys may include information that may be used as part of one or more cryptographic algorithms. A virtual HSM may be configured to handle cryptographic loads far greater than any single traditional HSM can handle, while also having the reliability of a distributed cluster. The virtual HSM's performance may be dynamically scaled to meet a client's needs—for example, as a customer's workload increases, the virtual HSM may scale up in response to the increased demand without the need for manual intervention by the client. Conversely, as a customer's workload decreases, the virtual HSM may scale down and resources may be freed or re-allocated for use by other clients. Thus, a virtual HSM may be transparently scaled up or scaled down such that a client does not need to anticipate, a priori, the size of the HSM that the client will need—the virtual HSM may be scaled up (or down) to meet the needs of the client.

The virtual HSM may transparently wrap the scaling, replacement, and configuration of a distributed cluster of HSMs such that a client may interact with the virtual HSM as a single logical HSM instance. By interacting with the virtual HSM, the client may simultaneously have the simplicity of interacting with a single logical HSM instance (as opposed to managing the security, synchronization, and coordination of a group of HSM instances) while also being able to meet workloads that far exceed those that any single physical HSM is capable of servicing. Additionally, clients and code that are able to interface with a physical HSM may also be able to interface with a virtual HSM in the same or similar manner, as the virtual HSM may be provisioned to provide the same set of operations and interfaces of a physical HSM.

A virtual HSM may be implemented as a service that includes a load balancer and a fleet of one or more physical HSMs. The load balancer may perform several functions including, but not limited to: receiving and routing client requests; creating and initializing the fleet of HSMs used by the virtual HSM; monitoring the virtual HSM and making determinations as to whether the fleet size should be increased, decreased, or unchanged; adding HSMs to the fleet of HSMs; removing HSMs from the fleet of HSMs; and more.

The load balancer may include a server front-end that receives requests from a client to perform cryptographic operations. The load balancer may determine whether a request should be processed, and may determine and coordinate how the request should be routed. The load balancer may include a fleet directory which may comprise a list of HSMs that are part of the fleet, as well as additional information regarding each HSM in the fleet. For example, the fleet directory may include, for each HSM in the fleet, an internet protocol (IP) address that may be used by a client to connect to the HSM. The fleet directory may also include additional information regarding the HSMs in the fleet that may be used as part of determining how to route client requests, such as the utilization level, geolocation, and capacity of each HSM in the fleet.

A client may, as part of the creation and initialization of a virtual HSM, generate a client identity key (CIK) and a client identity certificate (CIC) including the CIK public key. The CIK and CIC may be used to demonstrate that the client's identity remains consistent between different points in the virtual HSM instance lifecycle. The CIC may be provided to the virtual HSM as part of an initialization process.

The fleet of HSMs may be initially created by selecting a first, unused HSM from a pool of unused HSMs and provisioning it for use in the fleet. The HSM may be provisioned by first by erasing key material from the HSM and removing any pre-existing key material that may have been leftover, for example, from a previous use. As part of the erasure, each individual bit in which key material is found may be cleared (e.g., set to zero or a predetermined value). In this way, erased key material cannot be recovered by an inspection of the individual bits at a physical level (e.g., by measuring electromagnetic values of a disk after erasure). Additionally, entire sectors of storage may be reformatted or cleared as part of an erasure process. Sectors of storage may refer to physical subdivisions of storage (e.g., subdivisions of an electromagnetic and/or solid-state storage medium), but may also refer to logical subdivisions (e.g., a discrete cluster size operated on by a file system). As part of the initialization process, the HSM may store the CIC (e.g., in volatile or persistent storage) and generate an instance identifier key (IIK) and an instance identifier certificate (IIC). The HSM may provide, to the client, a certificate signing request (CSR) that includes the IIC. The client, upon receiving the request, may verify the signatures on the IIC and determine that the IIC is authentic. The client may then establish a secure cryptographic communication session such as a TLS session with the HSM using the public key contained in the IIC. At this point, the client and HSM may communicate securely via the secure cryptographic communication session. However, the client cannot yet trust that the virtual HSM instance is a valid instance. To establish that the virtual HSM instance is a valid instance, the virtual HSM, via an HSM of the fleet, may provide to the client a message that includes the IIC and any intermediate certificates needed to establish a chain of trust with the service certificate authority. The client, upon receiving the message, may verify that the virtual HSM instance is a valid instance by verifying the digital signature on the IIC, the signatures on the intermediate certificates, and determine that a valid chain of trust exists from the IIC to a trusted service certificate authority. The client then signs the CSR using the CIK private key to generate a client-instance identity certificate (CIIC) and sends a message including the CIIC to the virtual HSM instance, and the message is forwarded to the HSM. The HSM, upon obtaining the CIIC, may verify the digital signature on the CIIC by using the CIK public key that was previously provided in the CIC. If the CIIC is verified as being authentic, the HSM may trust that the client of the secure cryptographic communication session is the same client that requested the creation of the virtual HSM.

The client and HSM may then generate respective application keys and certificates that may later be used to establish application sessions. The HSM may create a new instance application key (IAK) asymmetric key pair and a corresponding instance application certificate (IAC) that includes the IAK public key and is signed by the IIK private key. The HSM may then transmit, over the secure cryptographic communication session, the IAC to the client. The client may store the IAC. Likewise, the client may create a new client application key (CAK) asymmetric key pair and a corresponding client application certificate (CAC) that includes the CAK public key and is signed by the CIK private key. The client may then transmit, over the secure cryptographic communication session, the CAC to the HSM. The HSM may receive the CAC and store it. Future secure cryptographic communication sessions may be created by using the CAC and CAK (by the client) and the IAC and IAK (by the virtual HSM) to demonstrate identities.

The load balancer may also monitor the virtual HSM and determine whether the fleet size should be increased, decreased, or remain unchanged. For example, the load balancer may monitor the rate of incoming cryptographic requests, the utilization level of the fleet, and determine, based on the rate of incoming traffic and the utilization level of the fleet, whether to increase the fleet size, decrease the fleet size, or leave the fleet size unchanged. Additional information may also be used to determine whether the fleet size should be increased or decreased, such as information regarding past and/or anticipated traffic patterns. In some embodiments, the monitoring and/or determining of whether the fleet size should be adjusted may be performed by a load monitor that may be a separate component from the load balancer (e.g., the load monitor may be hosted by a first service and the load balancer may be hosted by a second different service). In some embodiments, the load monitor may be a subsystem of the load balancer or vice versa.

When the load balancer determines that the HSM fleet should grow, for example to accommodate a rate of requests from a client that exceeds an upper threshold, the load balancer may select an unused HSM from a pool of unused HSMs to be added to the fleet. This new HSM (insofar as it may be new to the fleet) may be initialized by erasing or reformatting storage sectors of a disk of the HSM that may contain key material and removing any pre-existing key material that may have been leftover, for example, from a previous use. The load balancer may also provide to the fleet of HSMs contact information that may be used to establish a connection with the new HSM, such as an IP address. Using the contact information, an HSM in the fleet of HSMs may establish a secure cryptographic communication session with the new HSM. Upon establishing the secure cryptographic communication session, the fleet HSM encrypts key material for the virtual HSM instance under a fleet transfer key and sends the encrypted key material to the new HSM. The new HSM decrypts the key material and then has the same key state as the fleet HSM as well as other HSMs in the fleet.

When the load balancer determines that the HSM fleet should be reduced, for example to a rate of requests from clients that falls below a threshold, the load balancer may select an HSM from the fleet of HSMs used by the virtual machine that should be removed. Various criteria may be used in selecting an HSM to remove from the fleet, including the utilization level of the HSM, latency between the HSM and the client, and more. The selected HSM may be removed from the fleet directory so that subsequent requests to the virtual HSM are not routed to the HSM being removed. In some cases, the selected HSM should be removed from the fleet directory prior to modifying or deleting the key material of the selected HSM because new requests to the virtual HSM should not be handled by the HSM as it is being de-initialized. When the selected HSM is de-initialized, key material may be erased (e.g., by clearing one or more sectors of a disk storing key material) and all instance-specific key material is removed. In some cases, the selected HSM, after being removed from the fleet, may be placed into a pool of unused HSMs and made available for use by other virtual HSMs in the future.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which various embodiments can be implemented. The computing environment 100 illustrates a client 102 that may interact with a virtual HSM 108 over a network 104. In some embodiments, such as those illustrated in accordance with FIG. 1, a client 102 may be connected, via a network 104, to a service provider 106 that hosts a virtual HSM 108. The virtual HSM may include various subcomponents such as a fleet of HSMs 110 that includes one or more HSMs 112A and 112B, a load monitor 114, and a load balancer 116. The virtual HSM may further include one or more unused HSMs 118 that are not configured to be part of the fleet 110. In some embodiments, the service provider 106 may be software, hardware, or a combination thereof on one or more computer systems—for example, in a distributed computing system capable of servicing one or more clients 102. Clients such as the client 102 shown in FIG. 1 may be any entity operable to access the service provider 106, and may include remote clients that connect to the service provider 106 via a network 104 or may include internal clients—for example, a client and service provider may be hosted on the same physical hardware (e.g., using virtual machines). The network 104 may be any appropriate network, including an intranet, the Internet, a cellular network, a local area network, a satellite network or any other such network and/or combination thereof. An example embodiment in accordance with the present disclosure includes one or more customers of a distributed system.

The service provider 106 may include or have access to components, modules, libraries, or other executable code that operates as a frontend system and backend system. In some embodiments, the frontend system may comprise executable code, software components, hardware components, or any combination thereof that is distributed among one or more computer systems, for example in a distributed system. An example frontend system may be a web server operable to receive application programming interface (API) requests or a fleet of web servers operable to receive API requests. In an embodiment, a service frontend system receives a request from one or more clients and communicates with one or more virtual HSMs, such as the virtual HSM 108 shown in FIG. 1, to determine how to process the request.

The virtual HSM 108 may include a computer system, computer system process, program application, service module, or a combination of these and/or other such computing system entities. The virtual HSM 108 may be utilized by the service provider 106 to fulfill requests by a client to perform one or more cryptographic operations. Further, while a customer/provider relationship is discussed throughout the present disclosure for the purpose of illustration, the techniques described herein are adaptable to other contexts, such as when the client is an internal client of the service provider 106. In some embodiments, the service provider 106 may host the virtual HSM 108 or the virtual HSM 108 may be a subsystem within the service provider. However, in yet other embodiments, the service provider 106 and virtual HSM 108 may be separate systems. In some embodiments, a client may provide a request (e.g., via a network 104) directly to a virtual HSM 108 that is not hosted in a service. The virtual HSM may transparently wrap the scaling, replacement, and configuration of a fleet of HSMs by providing a set of cryptographic module interfaces in accordance with those provided by a traditional HSM. In this way, the client 102 may interact with the virtual HSM in the same or similar manner as a traditional HSM, and the client will not need to configure the scaling, replacement, configuration, etc. of the virtual HSM's underlying fleet of HSMs.

The service provider 106 may further be configured to utilize one or more virtual HSMs such as virtual HSM 108 for performing cryptographic operations. The virtual HSM 108 may be configurable to fulfill requests to perform cryptographic operations such as encryption and decryption. The virtual HSM 108 may include one or more components, such as a fleet 110 of HSMs that includes one or more HSMs 112A and 112B, a load monitor 114, a load balancer 116, and a repository of unused HSMs such as the unused HSM 118 shown in FIG. 1. The fleet 110 of HSMs may include a set of one or more HSMs that may be configured, by the virtual HSM 108, to fulfill requests to perform cryptographic operations.

In some embodiments, the virtual HSM 108 and/or one or more HSMs in the fleet 110 of HSMs may implement cryptographic modules interfaces that are in accordance with the security requirements for standards such as the most recent version of Federal Information Processing Standard (FIPS) Publication 140 which is incorporated into this document by reference. The virtual HSM and/or the HSMs in the fleet may incorporate FIPS 140 compliant security functions and may encrypt data according to the FIPS standard, such as the FIPS 140-2 standard.

An HSM 112A of the fleet 110 may be implemented as hardware, software, or a combination thereof. Each HSM of the fleet 110 may include information that may be used by the HSM to perform cryptographic operations such as encrypting data, decrypting data, and generating cryptographic keys, and may further include information that may be used in the context of performing operations in connection with or on behalf of the virtual HSM 108. For example, each HSM in the fleet 110 may include a fleet transfer key that may be used to encrypt and decrypt data transferred between HSMs in the fleet 110. The fleet transfer key may be implemented as a symmetric key or as an asymmetric key pair. For example, as part of synchronizing data from a first HSM 112A of the fleet to a second HSM 112B of the fleet, the data may be encrypted, using the fleet transfer key, by the first HSM 112A, the encrypted data transmitted to the second HSM 112B, and then decrypted, using the fleet transfer key, and stored by the second HSM 112B. In this way, data transmitted between the HSMs may be obfuscated from malicious parties that seek to read the data as it is being transmitted. Variations of such a system are also contemplated herein—for example, instead of or in addition to encrypting data in the manner described above, the first HSM 112A may generate a message authentication code (MAC) over the data and transmit the MAC. The MAC may be received by the second HSM 112B and may be used to ensure the authenticity (i.e., verify the sender of the message) and integrity (i.e., the message was not modified after it was sent) of the received data. In this way, data transmitted between the HSMs may be protected from malicious parties seeking to modify the data as it is being transmitted—the MAC may be verified against the message to determine whether it was modified.

Each HSM in the fleet 110 may also include data and key material that may be used as part of performing operations in connection with the virtual HSM. Each HSM in the fleet may include a list of all HSMs in the fleet as well as information that may be used for an HSM in the fleet to communicate with one or more other HSMs in the fleet. For example, each HSM in the fleet may include a list of network addresses for each other HSM in the fleet. A network address may be an IP address, a media access control address, or other such information to identify an HSM on a network. HSMs in the fleet may also contain key material, such as cryptographic keys and digital certificates that may be used as part of fulfilling requests made to the virtual HSM. Furthermore, HSMs in the fleet may also include information regarding communication sessions with the client. In some embodiments, the client 102 may communicate with the virtual HSM using a communication session and information (e.g., a session identifier, a session key, etc.) regarding the communication session may be stored on each HSM in the fleet such that any HSM in the fleet may participate (e.g., send and receive data) in the communication session. A communication session may be implemented using any suitable communication session protocol such as transport layer security (TLS), secure socket layer (SSL), secure shell (SSH), OpenSSH, Internet Protocol Security (IPSec), and the like. In some embodiments, the communication session may be a cryptographically protected communication session such as a TLS session.

The load monitor 114 may be any component operable to perform operations related to monitoring the HSM fleet 110 and/or the individual HSMs of the fleet. The load monitor may be implemented as hardware, software, or a combination thereof. The load monitor may perform various tasks related to monitoring the state of the virtual HSM such as determining the utilization level of the fleet and/or the rate of requests being received by the virtual HSM. Various states that the load monitor may be configured to detect may include: an "uninitialized" state; a "grow" state; a "reduce" state; and a "stable" state.

An "uninitialized" state may refer to the state of the virtual HSM where the virtual HSM is being provisioned or where the virtual HSM has been provisioned but the fleet 110 is an empty fleet (i.e., a fleet size of zero). An "uninitialized" state may arise, for example, immediately after a virtual HSM has been created but has not received any requests to perform cryptographic requests that would require using a HSM. A second example of when an "uninitialized" state may arise is described herein: a virtual HSM may be configured to reduce the fleet size in response to a decrease in the rate of requests. A virtual HSM may, after a period of receiving no requests to perform cryptographic operations that would require the use of an HSM, reduce the fleet size to zero. Such a period may be a predetermined fixed period of time or may be calculated, for example, based on various factors such as the amount of time the virtual HSM has been idle (i.e., has not received any cryptographic requests) and the number of unused HSMs in the repository.

The "grow" and "reduce" states may refer to the state of the virtual HSM such that the load monitor has determined that the fleet of HSMs should be scaled up or scaled down, respectively. In one example, the load monitor may determine, based on the rate of incoming cryptographic requests and the utilization level of the fleet that the fleet should scale up or scale down. If the utilization level of the fleet exceeds an upper threshold, additional HSMs may be added to the fleet, whereas if the utilization level of the fleet falls below a lower threshold, HSMs in the fleet may be removed from the fleet. The upper and lower thresholds may be predetermined fixed values or may be calculated, for example, based on various factors such as the number of HSMs in the fleet, the number of unused HSMs in the repository, and more. The upper and lower thresholds may be adjusted based on actual or anticipated traffic patterns. As an example, a virtual HSM may operate in an environment where it receives most of its traffic from end-users (e.g., humans) in a particular geolocation. Traffic patterns may be anticipated based on historical data regarding usage of the virtual HSM (e.g., the virtual HSM may receive abnormally high request loads during holidays such as Christmas) or may be derived from expected client behavior (e.g., higher request loads from end-user clients may be expected during normal business hours for the geolocation where the end-user clients are located).

A "stable" state may refer to the state of the virtual HSM such that the load monitor has determined that the fleet size should not be adjusted. A stable state may exist where the utilization level of the fleet and/or the rate of requests is between an upper threshold and a lower threshold.

The load monitor 114 may determine the utilization level of the fleet using various techniques, for example, through periodic polling of HSMs in the fleet and requesting each HSM provide an indication of its utilization level. In some embodiments, an HSM may provide, and the load monitor receive, the utilization as a number (e.g., an indication HSM is operating at 87% capacity) or may receive the utilization as a range (e.g., an indication HSM is operating at 76-100% capacity) or may receive the utilization in other forms (e.g., an indication HSM is operating at MEDIUM capacity). The load monitor 114 may include a fleet directory that includes a list of HSMs in the fleet and their respective network addresses. The load monitor 114 may be accessible by other components such as the load balancer 116. Additionally, in some embodiments, the load monitor 114 may be accessible to other services within the service provider 106.

The load balancer 116 may be any component operable to perform operations related to performing load balancing techniques with regard to the fleet 110 of HSMs. The load balancer 116 may be implemented as hardware, software, or a combination thereof. The load monitor may perform various load balancing tasks such as determining and coordinating how cryptographic requests to the virtual HSM 108 should be routed. The load balancer may automatically detect that that the HSM fleet should be scaled up or scaled down without explicit instructions from the client or requiring any special client configuration. Thus, the virtual HSM may be viewed as operating transparently—i.e., the client does not need to actively determine how to manage the fleet size and may interact with the virtual HSM in the same or similar manner as a traditional HSM.

The load balancer 116 may include a fleet directory that includes a list of HSMs in the fleet and their respective network addresses. The fleet directory may be stored, by the load balancer, in volatile memory (e.g., random access memory (RAM), memory cache, processor registers), persistent storage (e.g., a hard drive, network drive, database, distributed storage network), or a combination thereof. The fleet directory may also store additional information regarding the HSMs in the fleet that may be used in determining how to perform load balancing. For example, an actual (i.e., measured) latency between the client and HSM, an expected latency between the client and the HSM, the utilization level of the HSM, and more.

In some embodiments, the fleet directory may include additional information regarding the status of each HSM in the directory as to whether it is in a usable state. For example, an HSM that is in the process of being removed may be marked with a flag indicating that a delete is in progress. Such a flag may indicate to the load balancer that incoming client requests should not be routed to a particular HSM. In a system where the fleet of HSMs includes multiple underlying HSMs, the load balancer may select which particular HSM the request should be routed to—for example, the selected HSM may be the underlying HSM with the lowest utilization level, or may be the first HSM that the load balancer determines has a utilization level that is below an upper threshold. Additional criteria may be used in selecting the particular HSM the request should be routed to. For example, in a distributed system where underlying HSMs are physically located across the world (e.g., in multiple data centers), the selection of which HSM to fulfill the request may be based on the expected latency between the client and HSMs in the fleet, the utilization level of the HSMs in the fleet, or a weighted score based on one or more criteria (e.g., a weighted score based on latency and utilization). In an example, a weighted score may be calculated such that HSMs having lower latencies to a client are weighted more heavily than HSMs having higher latencies. As a result, a virtual HSM having several high-latency HSMs in the fleet may scale up as to provide more HSMs to compensate for the higher latencies.

The load balancer 116 may be accessible by other components such as the load monitor 114. Additionally, in some embodiments, the load balancer 116 may be accessible to other services within the service provider 106. In some embodiments, the load balancer 116 may select which particular HSM of the fleet 110 the request should be routed to—for example, the selected HSM may be the HSM of the fleet 110 with the lowest utilization level, or may be the first HSM that the load balancer 116 determines has a utilization level that is below a particular utilization level such as the upper threshold described above. Additional criteria may be used in selecting the particular HSM the request is routed to. For example, in a distributed system where underlying HSMs are physically located across the world (i.e., in multiple data centers), the selection of which HSM to fulfill the request may be based at least in part on the expected latency between the client and the HSMs in the fleet, the utilization level of the HSMs in the fleet, or a weighted score based on one or more criteria (e.g., a weighted score based on latency and utilization). In some embodiments, the load balancer 116 obtains information regarding the utilization level of the HSMs in the fleet from the load monitor 114. In some embodiments, the load monitor 114 and load balancer 116 may be subsystems of a larger system.

The virtual HSM 108 may further include one or more unused HSMs 118. The unused HSM 118 shown in FIG. 1 is not part of the fleet 110 of HSMs. The unused HSM 118 may be added to the fleet 110, for example, by the load balancer in response to determining that the virtual HSM is in a "grow" state as described above. Likewise, when an HSM in the fleet 110 is removed from the fleet, for example in response to a "reduce" state as described above, the HSM removed from the fleet 110 may be marked as an unused HSM that may be made available to the fleet 110. In some embodiments, unused HSMs may be stored in a repository and may be stored outside of the virtual HSM in such a manner that unused HSMs can be made available to multiple virtual HSMs in a service provider 106.

Figure 2:
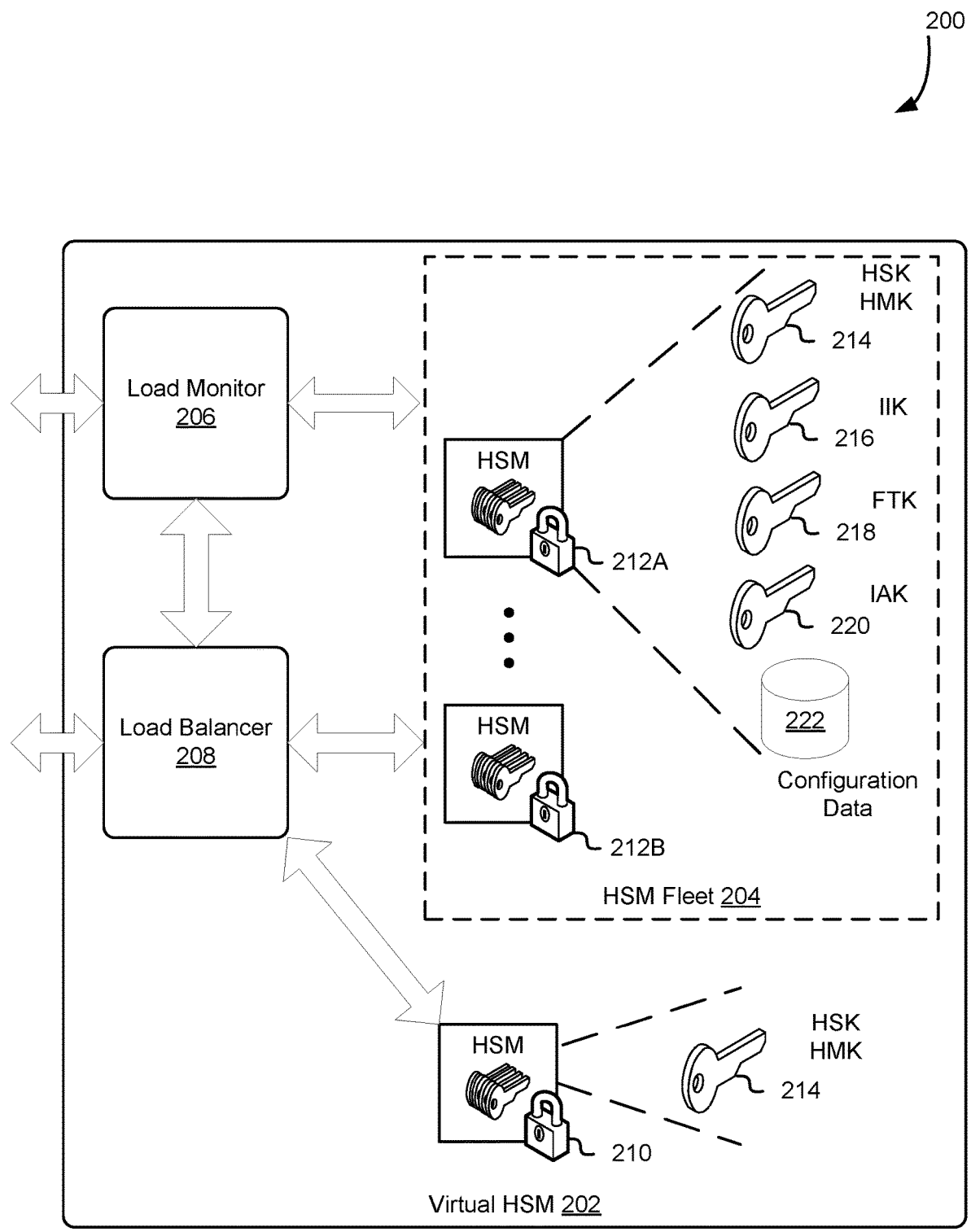
FIG. 2 shows an illustrative example of a virtual HSM.

FIG. 2 illustrates an environment in which various embodiments can be implemented. The computing environment 200 illustrates a virtual HSM 202 that includes a fleet 204 of HSMs, a load monitor 206, a load balancer 208, and one or more unused HSMs 210 and cryptographic key material that may be used for operating the virtual HSM 202. The HSM fleet 204, load monitor 206, load balancer 208, and unused HSM 210 may be implemented in accordance with the respective components described above, such as those described in connection with FIG. 1.

A virtual HSM, such as those described in connection with FIGS. 1 and 2, may implement one or more cryptographic module interfaces for performing cryptographic operations. These cryptographic module interfaces may be in accordance with interfaces supported by physical HSMs, such as the PKCS #11 standard. Thus, a client that uses a traditional HSM to perform cryptographic operations with PKCS #11 APIs may, instead use a virtual HSM in the same or similar manner to perform PKCS #11 APIs.

Additionally, HSMs of the fleet 204 may store cryptographic key material and data that may be used as part of operating the virtual HSM 202. An HSM 212A and 212B of the fleet may include: a HSM service key 214 and certificate; a HSM manufacturer key 214 and certificate; an instance identity key 216 and certificate; a fleet transfer key 218; an instance application key 220; and configuration data 222.

In some embodiments, the HSM service key (HSK) 214 is an asymmetric key pair and the HSM service certificate (HSC) is a digital certificate containing the HSK public key and is signed by a service certificate authority. The service certificate authority may be a root certificate authority that is trusted to provide a public demonstration of the service's identity and verify key pairs generated by the service. The service may, for example, be the service provider described above in connection with FIG. 1. The HSK and HSC may be used to demonstrate that a cryptographic key, such as one generated by the HSM 212A, was generated on a device managed by the service. A digital certificate may be used to prove the ownership of a public key, and may include information regarding the key, the owner's identity, and the digital signature of an entity that has verified the certificate's contents. Digital signatures described in this reference may be in accordance with various standards such as X.509.

Likewise, in some embodiments, the HSM manufacturer key (HMK) 214 is an asymmetric key pair and the HSM manufacturer certificate (HMC) is a digital certificate containing the HMK public key and is signed by a manufacturer certificate authority. The manufacturer certificate authority may be a trusted root certificate authority that is trusted to provide a public demonstration of the manufacturer's identity and verify key pairs generated by the manufacturer. The HMK and HMC may be used to demonstrate that a cryptographic key, such as one generated by the HSM 212A, was generated on a device certified by the manufacturer.

The instance identity key (IIK) 216 may be an asymmetric key pair and the instance identity certificate (IIC) is a digital certificate containing the IIK public key and is signed by the HMK and HSK. The IIK and IIC may be used to demonstrate both that the virtual HSM 202 is running on HSMs that are managed by the service. The IIC and IIK may be created as part of the provisioning process that occurs when the first HSM is added to the fleet 204.

In some embodiments, the fleet transfer key (FTK) 218 is a symmetric key that is used to encrypt cryptographic key material being transferred between HSMs in the fleet 204. In some embodiments, the fleet transfer key may be transmitted from one HSM to another by encrypting it with the HSK public key and the HMK public key and transmitting the double-encrypted FTK. Another HSM in the fleet may receive the double-encrypted FTK and decrypt it using the HMK private key and the HSK public key and thereafter store the FTK.

The instance application key (IAK) 220 may be an asymmetric key pair and the instance application certificate (IAC) is a digital certificate containing the IAK public key and is signed by the IAK private key. The IAK and IAC may be used to demonstrate the instance's identity while setting up an application session, such as a TLS session.

In some embodiments, configuration data 222 may include data that may be used by the HSM 212A to communicate with other HSMs in the fleet 204. The configuration data may include a list of network addresses for all HSMs in the fleet 204. Additional configuration data may include, for example, information regarding active communication sessions between a client (such as the client described in connection with FIG. 1) and the virtual HSM 202. In an embodiment, the client and virtual HSM communicate via one or more TLS sessions and the configuration data contains a list of active TLS sessions and the corresponding TLS session IDs. The configuration data may be stored in volatile memory (e.g., RAM), persistent storage (e.g., a hard drive, network drive, distributed storage network, or database), or a combination thereof.

FIG. 2 further illustrates a virtual HSM 202 that includes an unused HSM 210. One or more unused HSMs may be added to the fleet 204 and HSMs in the fleet 204 may be removed and marked as unused. In some embodiments, an unused HSM 210 has access to the HSM service key (including the HSK private key) and HSM service certificate as well as the HSM manufacturer key (including the HMK private key) and the HSM manufacturer certificate. In some embodiments, the unused HSM 210 further includes additional configuration data related to the operation of the HSM generally, such as critical security parameters. In some embodiments, the unused HSM 210 may further include either all or some of the key material included in the fleet HSMs—in some embodiments, an HSM that is removed from the fleet 204 may only have some (or even none) of the key material associated with the virtual HSM. For example, in some embodiments, when an HSM is removed from the fleet, digital certificates such as the instance identity certificate may remain on the unused HSM 210. In some embodiments, such a design would result in improved performance when adding and removing HSMs to and from the fleet, respectively, as less key material would need to be synchronized and removed when an unused HSM is added to and removed from the fleet, respectively.

It should be noted that while FIG. 2 illustrates an embodiment that includes a virtual HSM 202 and a fleet 204 of HSMs, other types of cryptographic modules may be configured in the same or similar manner. More generally, a virtual cryptographic module may include a fleet of cryptographic modules. Alternative embodiments and examples described in connection with virtual HSMs may also be applied to virtual cryptographic modules. Other embodiments, such as those shown in figures other than FIG. 2, may also be configured using cryptographic modules, generally, in place of HSMs.

Figure 3:
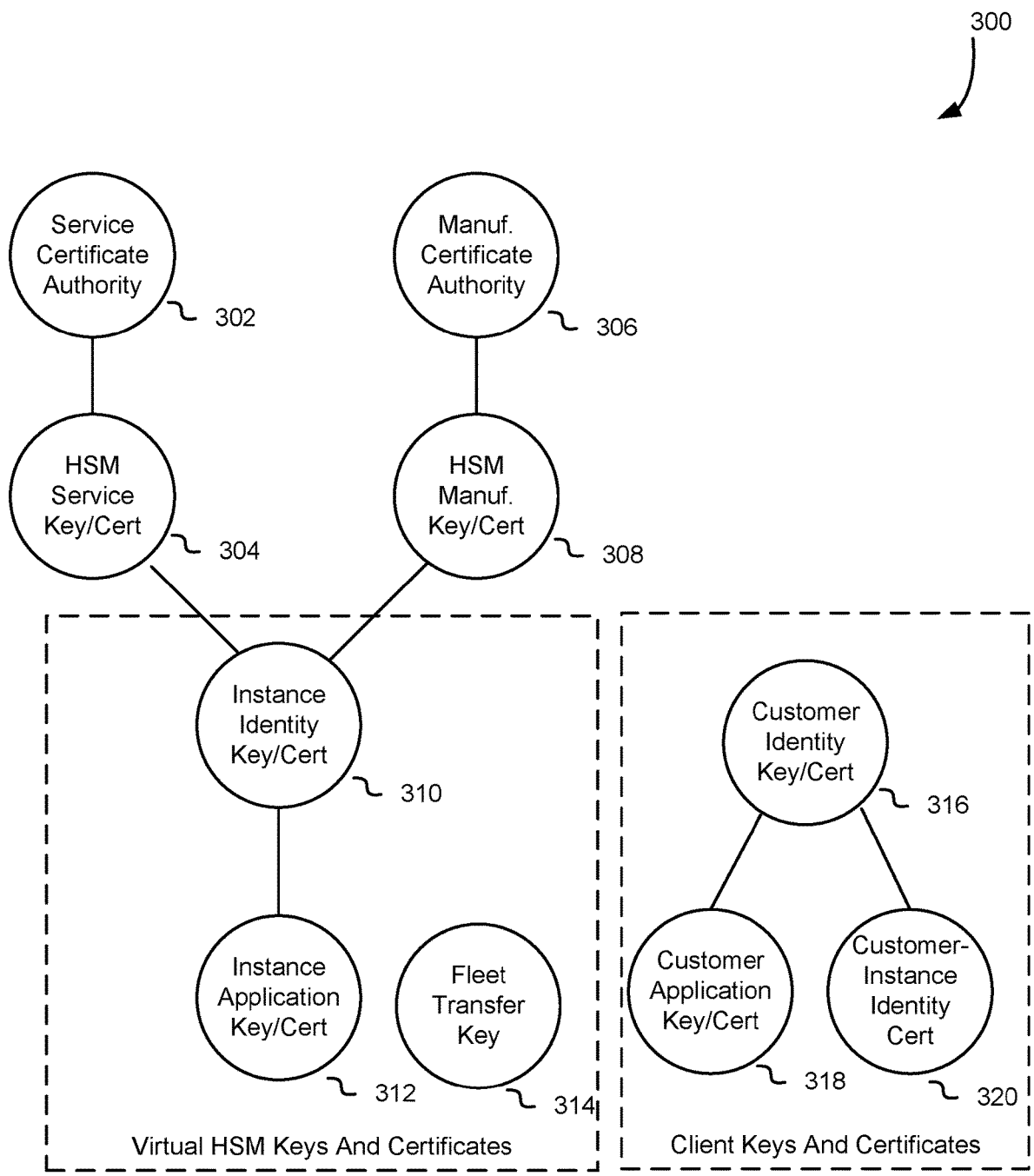
FIG. 3 shows an illustrative example of chains of trust in connection with the operation of a virtual HSM.

FIG. 3 illustrates the chains of trust 300 in accordance with various embodiments that can be implemented. A chain of trust may be used to validate that hardware and software components are trusted. In some embodiments, the service certificate authority (SCA) 302 serves as a trust anchor and may be used to publicly demonstrate the service's identity and verify that other key pairs were generated by the service. The HSK and HSC may be created, on an HSM, by the service provider. The SCA may provide a service root certificate including a SCA public key and a digital certificate signed by a SCA private key. The SCA public key may be used to verify the authenticity of the service root certificate.

The HSM service key (HSK) and certificate (HSC) 304 may be used to sign digital certificates and may be used to demonstrate that certificates signed by the HSK are generated by a device managed by the service provider. The HSK may be an asymmetric key pair and the HSC may include the HSK public key and may be digitally signed by the service certificate authority. In some embodiments, the validity of the HSC may be verified using a SCA public key that may be provided by the service certificate authority or the service provider.

In some embodiments, the manufacturer certificate authority (MCA) 306 serves as a trust anchor and may be used to publicly demonstrate the manufacturer's identity and verify that other key pairs were generated by the manufacturer. The MCA may provide a manufacturer root certificate including a MCA public key and a digital certificate signed by a MCA private key. The MCA public key may be used to verify the authenticity of the manufacturer root certificate.

The HSM manufacturer key (HMK) and certificate (HMC) 308 may be used to sign digital certificates and may be used to demonstrate that certificates signed by the HMK are generated by a device managed by the manufacturer. The HMK and HMC may be created, on an HSM, by the HSM manufacturer. The HMK may be an asymmetric key pair and the HMC may include the HMK public key and may be digitally signed by the manufacturer certificate authority. In some embodiments, the validity of the HMC may be verified using a MCA public key that may be provided by the manufacturer certificate authority.

The instance identity key (IIK) and certificate (IIC) 310 may be used to demonstrate that an instance is running on one or more HSMs of the service provider and to verify that other keys were generated by a particular virtual HSM. The IIK and IIC may be created by an HSM, a virtual HSM's fleet of HSMs, or by an HSM during a provisioning process where it is being added to the fleet of a virtual HSM. The IIK may be an asymmetric key pair and the IIC may include the IIK public key and may be digitally signed by the HMK and the HSK. In some embodiments, such as those where the HMK and HSK are implemented as asymmetric key pairs, the IIC may be digitally signed by the HMK private key and the HSK private key and the authenticity of the IIC may be verified by checking the signature using both the HMK public key and the HSK public key.

The instance application key (IAK) and certificate (IAC) 312 may be used to demonstrate the instance's identity when setting up an application session. An application session may be a cryptographically protected communication session, such as a TLS session. The IAK and IAC may be created by an HSM as part of an initial virtual HSM setup or provisioning process. The IAK may be an asymmetric key pair and the IAC may include the IAK public key and may be digitally signed by the IIK. In some embodiments, such as those where the IIK is implemented as an asymmetric key pair, the IAC may be digitally signed by the IAK private key and the authenticity of the IAC may be verified by checking the signature using the IIC public key.

The fleet transfer key (FTK) 314 may be used to encrypt key material being transferred between HSMs in a virtual HSM's fleet of HSMs. The FTK encryption may be used in addition to encryption that is used as part of the protocol of a cryptographically protected communication session, such as a TLS session. In some embodiments, the FTK is implemented as a symmetric key, but may also be implemented as an asymmetric key pair in other embodiments.

In some embodiments, key material for the virtual HSM may refer to the IIK/IIC 310, the IAK/IAC 312, and the FTK 314. In some embodiments, key material for the virtual HSM may be synchronized between HSMs in the fleet using various known techniques, techniques described in this disclosure, or a combination thereof.

The client identity key (CIK) and certificate (CIC) 316 may be used to demonstrate that the client's identity remains consistent between different points in the virtual HSM lifecycle. The CIK and CIC may be created by a client and may be unique to that particular client. The CIK may be an asymmetric key pair and the CIC may include the CIK public key and may be self-signed (i.e., digitally signed by the client using the CIK private key).

The client application key (CAK) and certificate (CAC) 318 may be used to demonstrate the client's identity when setting up an application session. An application session may be a cryptographically protected communication session such as a TLS session. The CAK and CAC may be created by a client as part of an initial virtual HSM setup or provisioning process. The CAK may be an asymmetric key pair and the CAC may include the CAK public key and may be digitally signed by the CIK. In some embodiments, such as those where the CIK is implemented as an asymmetric key pair, the CAC may be digitally signed by the CAK private key and the authenticity of the CAC may be verified by checking the signature using the CIC public key.

The client-instance identity certificate (CIIC) 320 may be used to demonstrate that the client setting up the instance is the same client that initially created it, and demonstrate that the virtual HSM is the same one with which the client had previous been communicating. The CIIC may be created by a client as part of an initial virtual HSM setup or provisioning process. The CIIC may be created by signing a certificate signing request that includes a digital certificate and/or public key. A certificate signing request may be a message sent to an entity in order to apply for a digital certificate from the entity. The format of a certificate signing may be in accordance with various standard formats, such as PKCS #10 and Signed Public Key and Challenge (SPKAC). In some embodiments, the CIIC is digitally signed by the CIK public key. In some embodiments, key material for the client may refer to the CIK/CIC 316, the CAK/CAC 318, and the CIIC 320.

Additionally, various intermediate certificates may be part of the chain of trust. For example, an intermediate certificate may exist between the service certificate authority and the HSM service key and certificate. In such an example, the service certificate authority may provide a root certificate that includes a root public key and is signed by the service certificate authority. The root certificate's public key may be used to verify the digital signature on an intermediate certificate. The intermediate certificate may include an intermediate public key and may include a digital certificate that can be verified by the root public key. The intermediate public key may be used to verify the digital signature on the HSM service certificate. Returning to embodiments in accordance with FIG. 3, one or more intermediate certificates may exist between any two connected nodes (i.e., any two nodes where a chain of trust exists).

Figure 4:
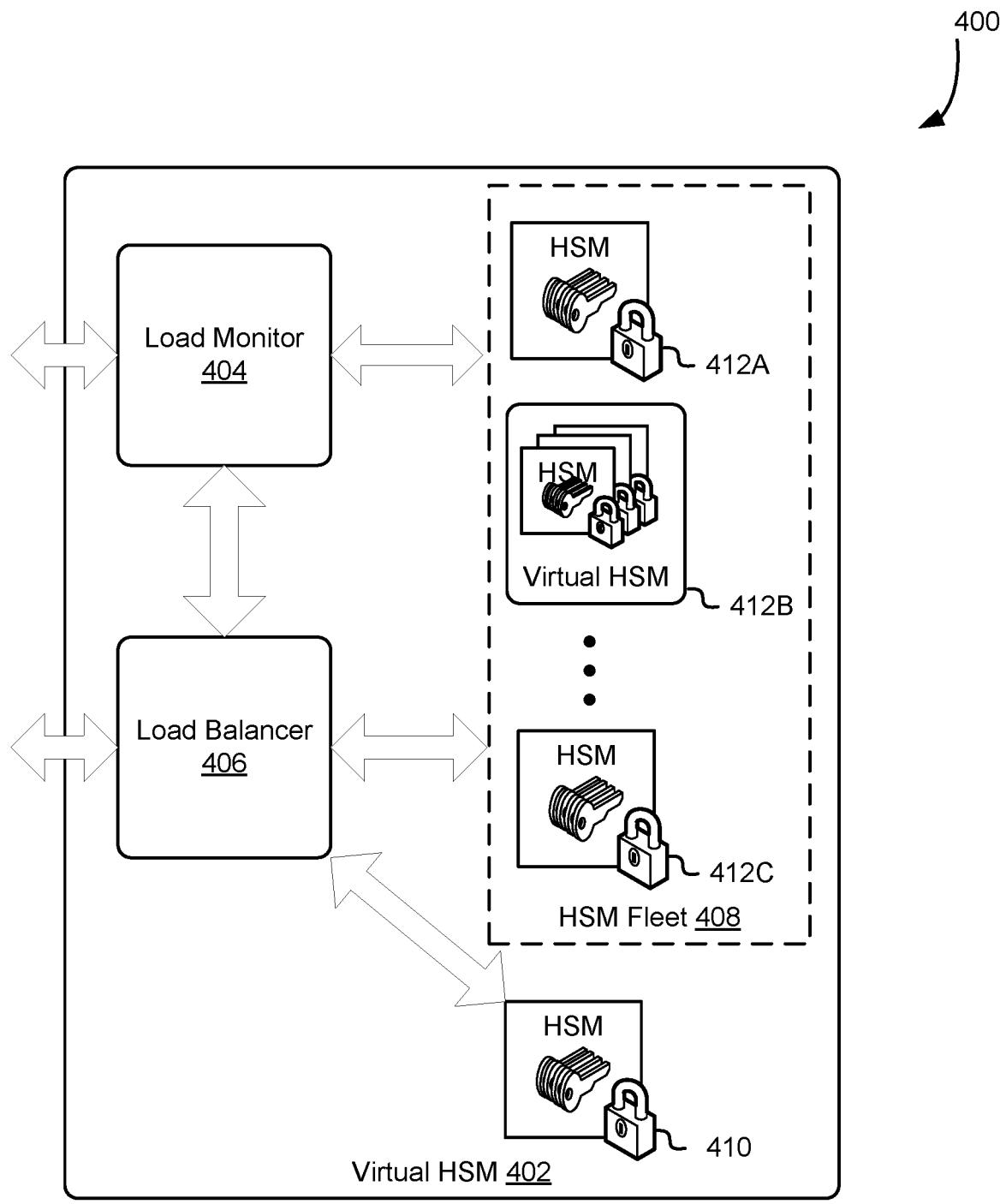
FIG. 4 shows an illustrative example of a nested virtual HSM.

FIG. 4 illustrates an environment in which various embodiments can be implemented. The computing environment 400 illustrates a parent virtual HSM 402 that includes a load monitor 404, a load balancer 406, a fleet 408 of HSMs, and one or more unused HSMs 410. The load monitor 404, load balancer 406, HSM fleet 408, unused HSM 410, and various components may be implemented in accordance with the respective components described in other figures such as FIGS. 1 and 2. In some embodiments, the HSM fleet 408 may include one or more HSMs, such as the HSMs 412A, 412B, and 412C illustrated in FIG. 4. As shown by the ellipses, there may be additional HSMs in the fleet 408.

In some embodiments, virtual HSMs may be nested (e.g., a first parent virtual HSM may include a second child HSM). The fleet of HSMs 408 may include one or more child virtual HSMs such as the child virtual HSM 412B shown in FIG. 4. As discussed above, a virtual HSM may implement the same or similar interfaces as a physical HSM—the HSM fleet 408 may provision, add, interact with, and remove the child virtual HSM 412B in the same or similar manner as other HSMs 412A and 412C in the fleet 408. In some embodiments, the parent virtual HSM 402 may provision the child virtual HSM 412B in the same or similar manner in which a client (such as the client 102 of FIG. 1) interacts with a virtual HSM (such as the virtual HSM 108 of FIG. 1). Additional levels of nesting may exist (e.g., the child virtual HSM 412B may include its own child fleet of HSMs that includes a grandchild virtual HSM). In some embodiments, at least some of the key material for the parent virtual HSM 402 may be different from the key material for the child virtual HSM 412B.

Figure 5:
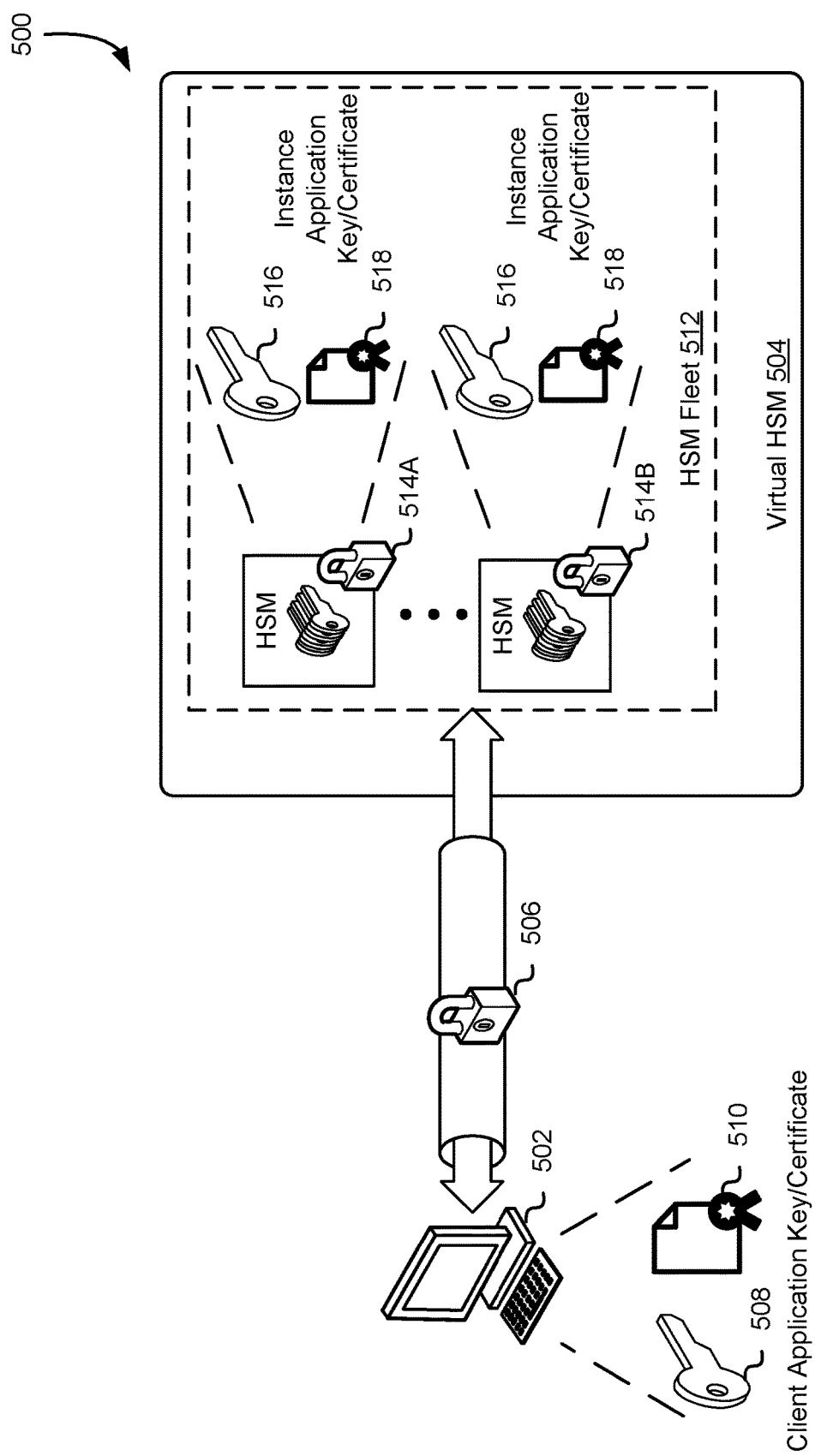
FIG. 5 shows an illustrative example of a client and a virtual HSM communicating over an application session.

FIG. 5 illustrates an environment in which various embodiments can be implemented. The computing environment 500 illustrates a client 502 and virtual HSM 504 connected via a cryptographically protected communication session 506. In some embodiments, the client 502 uses the client application key 508 and client application certificate 510 to communicate over the cryptographically protected communication session 506. In some embodiments, the client application key 508 is an asymmetric key pair and is created by the client 502 prior to establishing the cryptographically protected communication session 506. The cryptographic keys and certificates illustrated in FIG. 5 may be implemented in accordance with those described in other figures of this disclosure.

Cryptographically protected communications sessions may be used to access resources. The cryptographically protected communications sessions may be used, for example, for the transfer of data from one entity to another such as from a client to a server or from the client to the server. The cryptographically protected communication session may be used, for instance, to ensure integrity of the data traversing a network between the entities and/or to ensure confidentiality of the data as it traverses the network.

In some embodiments, the client 502 establishes a cryptographically protected communication session 506 with the virtual HSM 504 by establishing a cryptographically protected communication session with one or more HSMs 514A and 514B in the fleet. For example, a client 502 may send a request to the virtual HSM 504 to establish a communication session and the request may be routed to a fleet HSM 514A and the fleet HSM 514A may perform a handshake or other various operations that may be required to establish the requested communication session. Continuing with the example, the client 502 may issue a TLS ClientHello message to the virtual HSM 504 requesting to establish a TLS session and the virtual HSM 504 may route the ClientHello message to a fleet HSM 514A and the fleet HSM 514A may generate a TLS ServerHello message.

A fleet HSM 514A may include an instance application key 516 and an instance application certificate 518 that may be used to establish the cryptographically protected communication session and/or communicate over the cryptographically protected communication session. The IAK 516 and IAC 518 may be stored in and/or accessible to each HSM of the fleet 512. When an HSM is added to the fleet 512, the IAK and IAC may be synchronized to the added HSM by other HSMs in the fleet.

In some examples, the client 502 may communicate with more than one HSM of the fleet 512. In an example, the client 502 may establish a TLS session with a first HSM 514A of the fleet 512. As part of establishing the TLS session, the first HSM 514A may generate or obtain a session key and provide (e.g., via a synchronization routine) the session key to other HSMs in the fleet 512. The client 502 may send an encrypted TLS message to the virtual HSM 504 via the TLS session, the encrypted TLS message may be routed to the first HSM 514A, but may also be routed to another HSM 512B of the fleet which, having the session key, may decrypt the encrypted TLS message.

Figure 6:
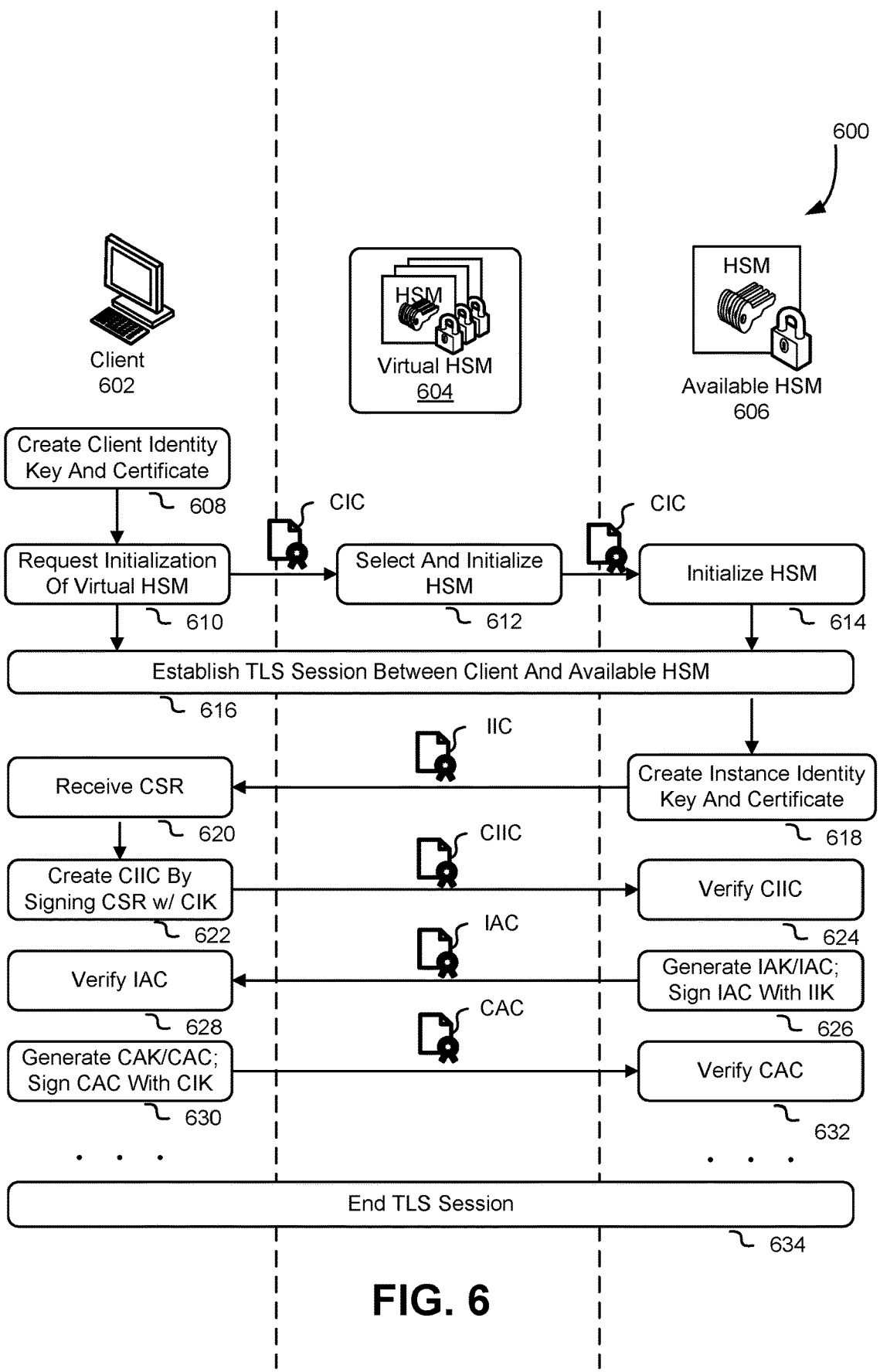
FIG. 6 shows a diagram illustrating the initialization of a virtual HSM.

FIG. 6 illustrates an environment in which various embodiments can be implemented. The computing environment 600 illustrates a process for initializing and provisioning a virtual HSM. A client 602 may create 608 a client identity key and client identity certificate such as those described in this disclosure. For example, the client identity key may be an asymmetric key pair having a CIK public key and a CIK private key. In some embodiments, the client may also obtain the key and certification from a trusted party or delegate the creation of the key and certificate to another party.

The client 602 may issue a request 610 to create a virtual HSM and provide, as part of the request, the client identity certificate. The CIC may include the CIK public key and be digitally signed by the CIK private key. A service provider (not shown in FIG. 6) may receive the request and route it to the virtual HSM 604 which may be in an uninitialized state such as the uninitialized state described above. In some embodiments, a request to initialize the virtual HSM may be implied—for example, the first request to a virtual HSM to fulfill a request (e.g., perform a cryptographic operation) may impliedly be a request to initialize the virtual HSM.

The virtual HSM 604 may receive the request and select 612 an unused HSM 606 and perform initialization tasks related to initializing the virtual HSM. For example, the virtual HSM may provide an indication that the unused HSM has been removed from a pool of unused HSMs and is not available for use for other virtual HSMs and/or provide an indication that the HSM is being joined to a new fleet. The virtual HSM may further also indicate that it is no longer in an uninitialized state and has transitioned into a state wherein initialization is in progress or pending. The CIC provided by the client 602 is then provided to the HSM 606. The HSM 606 may, as part of its initialization, verify the signature on the CIC and store the CIK public key contained in the CIC after verifying the signature. The HSM 606 may also perform an initialization 614 routine, such as checking for key material and erasing data such as key material from the HSM so that it is in a clean state. The client 602 and HSM 606 may establish 616 a cryptographically protected communication session such as a TLS session.

Upon establishing 616 the cryptographically protected communication session, the client and HSM may perform a routine for mutually verifying the counterparty's identity. The HSM 606 may create 618 or obtain an instance identity key and instance identity certificate. The HSM 606 may issue a certificate signing request that includes the instance identity certificate, via the cryptographically protected communication session, to the client 602. The client 602 may receive 620 certificate signing request and the instance identity certificate. The client may then create 622 a client-instance identity certificate by digitally signing the certificate signing request using the CIK public key. The client may transmit the client-instance identity certificate, via the cryptographically protected communication session, to the HSM 606 and the HSM may use the IIK private key to verify 624 the signature on the CIIC. The HSM may generate 626 an instance application key and instance application certificate, sign the IAC with the IIK private key, and transmit the IAC to the client. The client may receive and verify 628 the IAC using the public key contained in the previously received IIC. The client may generate 630 a client application key and client application certificate, sign the CAC with the CIK private key, and transmit the CAC to the HSM. The HSM may receive and verify 632 the CAC using the public key contained in the previously received CIC. Note that the order in which the client and HSM generate their respective application keys may be interchanged, may also occur simultaneously (e.g., in parallel), and may occur in a non-deterministic order. The client and instance application keys and certificates may be used to create an application session between the client and virtual HSM, such as a TLS session. Finally, either the client or the HSM may end 634 the communication session.

Figure 7:
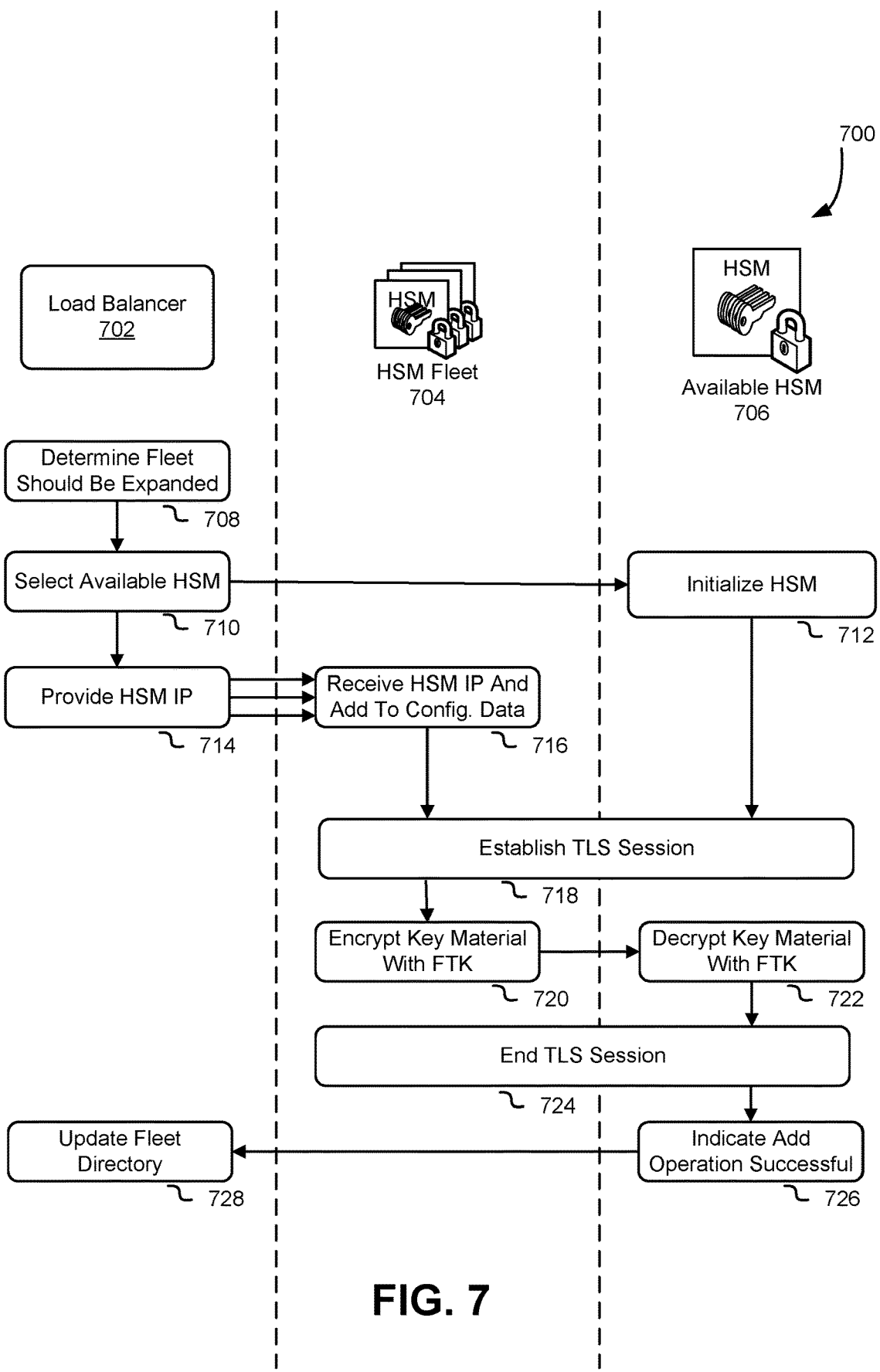
FIG. 7 shows a diagram illustrating the addition of an HSM to the fleet of HSMs of a virtual HSM.

FIG. 7 illustrates an environment in which various embodiments can be implemented. The computing environment 700 illustrates a process for scaling up a virtual HSM (e.g., adding an HSM to the fleet). The load balancer 702 of a virtual HSM may determine that the fleet should be expanded 708. The determination may be made in accordance with techniques described in this disclosure, for example, based on determining that the rate of incoming cryptographic requests exceeds an upper threshold. The load balancer may select 710 an available or unused HSM 706, for example, from a repository of unused HSMs and then initialize 712 the HSM.

The load balancer may provide 714 the network address of the HSM 706 to a fleet 704 of one or more HSMs. In some embodiments, a message with the network address may be sent to each HSM in the fleet (denoted by the multiple lines shown between 714 and 716). However, in other embodiments, a message with the network address may be sent to only one HSM in the fleet, or to a subset of the fleet. In such embodiments, a fleet synchronization mechanism may be used to propagate the network address of the HSM 706 to any HSMs in the fleet that did not receive the message. Furthermore, in some embodiments, information in addition to or other than an network address may be provided, so long as the information is sufficient for an HSM in the fleet to establish a cryptographically protected communication session with the HSM 706 being added to the fleet. In some embodiments, at least one HSM in the fleet receives 716 the HSM 706 network address and adds information related to the HSM 706 to its configuration data. The configuration data may, for example, include network addresses for some or all HSMs in the fleet.

In some embodiments, an HSM in the fleet establishes 718 a TLS session with the HSM 706. While a TLS session is illustrated in FIG. 7, other cryptographically protected communication sessions may be used as well. Via the cryptographically protected communication session, the HSM in the fleet encrypts 720 fleet key material using the fleet transfer key and transmits it to the HSM 706. The HSM 706 may receive and decrypt 722 the key material and store it. In some embodiments, configuration data (such as the configuration described above in connection with FIG. 2) may also be synchronized with the HSM 706 in the same or similar manner. In some embodiments, the fleet transfer key may be transferred from the HSM in the fleet to the HSM 706 being added using techniques described above in connection with the fleet transfer key described in FIG. 2. The TLS session may be ended 724 after the key material is transferred. The HSM 706 may indicate 726 that it was successfully added to the fleet, for example, by providing an indication to the load balancer. The load balancer may update 728 its fleet directory and/or state information (e.g., updating from a "grow" state to a "stable" state) by adding the HSM 706 to the load balancer's list of HSMs in fleet which may be used, for example, to route client requests. Additionally, it should be noted that while a load balancer is illustrated in FIG. 7 as performing some of the steps in connection with adding an HSM of the fleet, other components of the virtual HSM may perform the same or similar function.

Figure 8:
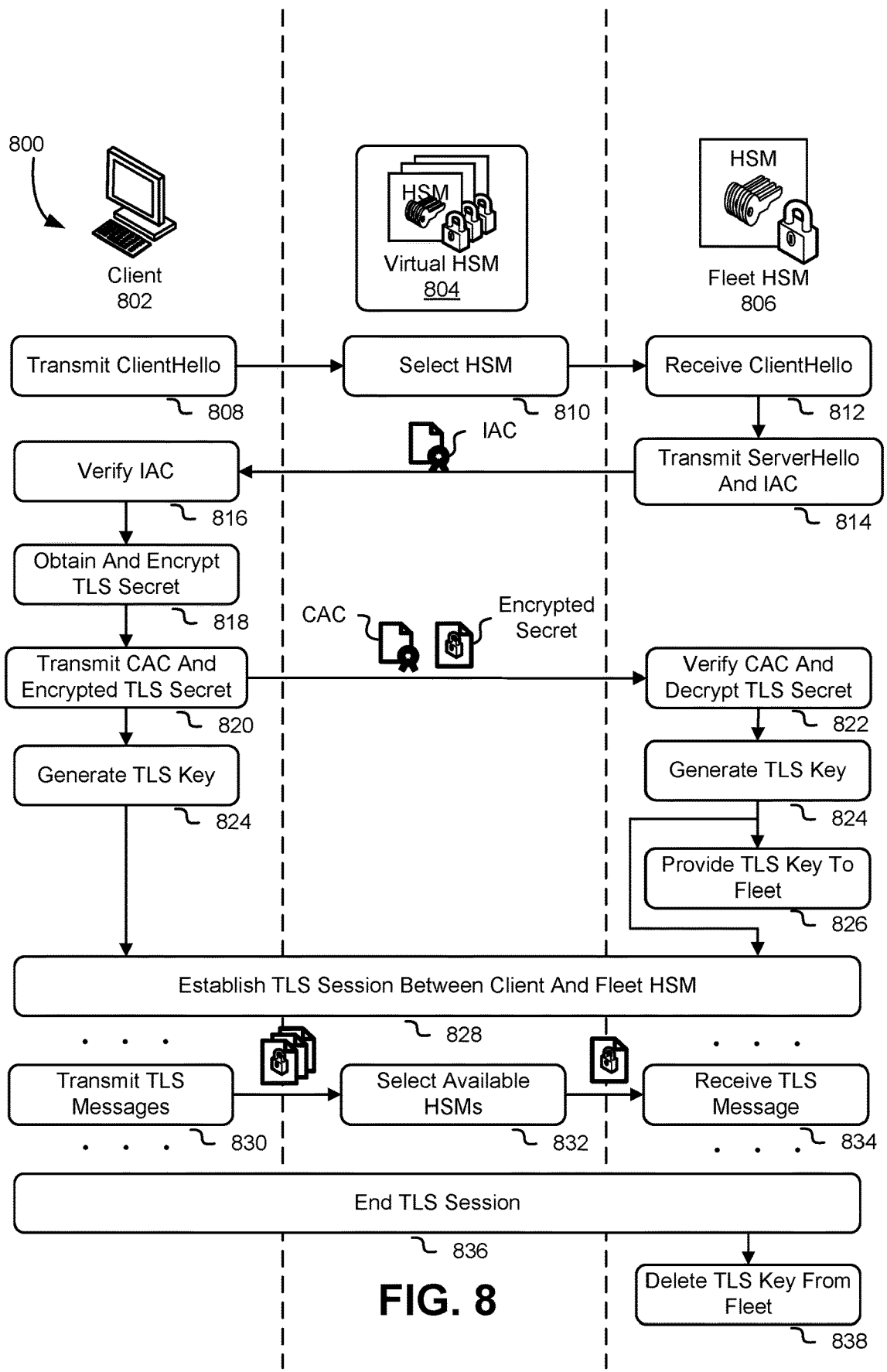
FIG. 8 shows a diagram illustrating a client and a virtual HSM communicating over an application session.

FIG. 8 illustrates an environment in which various embodiments can be implemented. The computing environment 800 illustrates a process for establishing an application session between a client 802 and a virtual HSM 804. FIG. 8 illustrates an embodiment where the client 802 and virtual HSM 804 establish a TLS session—however, other cryptographically protected communication sessions may be used as well. The client 802 transmits 808 a TLS ClientHello to a virtual HSM 804. The virtual HSM may (e.g., using a load balancer and/or load monitor) select 810 an HSM in the fleet of HSMs for receiving the ClientHello message. The selected HSM 806 of the fleet may receive 812 the TLS ClientHello message and transmit 814 a ServerHello message containing the instance application certificate and one or more supported cipher suites to the client. The client may receive and verify 816 the instance application certificate, for example, using an instance identity key that the client previously obtained (e.g., during an initialization process such as the initialization described in connection with FIG. 6). The client may obtain and encrypt 818 a TLS secret, for example using a public key included in the instance application certificate. The TLS secret may be usable to obtain or generate a TLS session key. The client may transmit 820 a client application certificate and the encrypted TLS secret to the HSM. The HSM may receive and verify 822 the client application certificate and decrypt the TLS secret, for example using a private key corresponding to the public key provided in the instance application certificate. The client 802 and the fleet HSM 806 may both generate 824 the TLS session key, which may be generated based at least in part on the TLS secret. The fleet HSM 806 may propagate the TLS session key to other HSMs in the fleet of HSMs 826. The client and HSM may establish 828 a TLS session and communicate, via the session, using the TLS session key. The client may transmit 830 multiple messages encrypted under the TLS session key. The virtual HSM 804 may receive those messages and determine how to route those messages. The virtual HSM may use a load balancer to select 832 one or more HSMs to receive and process the messages 834, as well as how to coordinate the requests. For example, the client may transmit three messages encrypted under the TLS session and each may be routed to a separate HSM of the fleet of HSMs in the virtual HSM. In some embodiments, the fleet HSM 806 may receive one or more of the messages. However, in other embodiments, the fleet HSM 806 that established the TLS session may not receive any subsequent messages in the session. The TLS session may be ended 836 by the client or by an HSM in the fleet of HSMs. Either concurrent with or after the TLS session ends, an HSM in the fleet of HSMs may delete 838 the TLS session key and propagate the delete instruction such that the TLS session key is deleted from all HSMs in the fleet of HSMs—this may be done using various synchronization techniques. It should be noted that while the same HSM 806 of the fleet that established the TLS session is shown as deleting the TLS session key from the fleet, that another HSM in the fleet may, instead, delete the TLS session key from the fleet.

Figure 9:
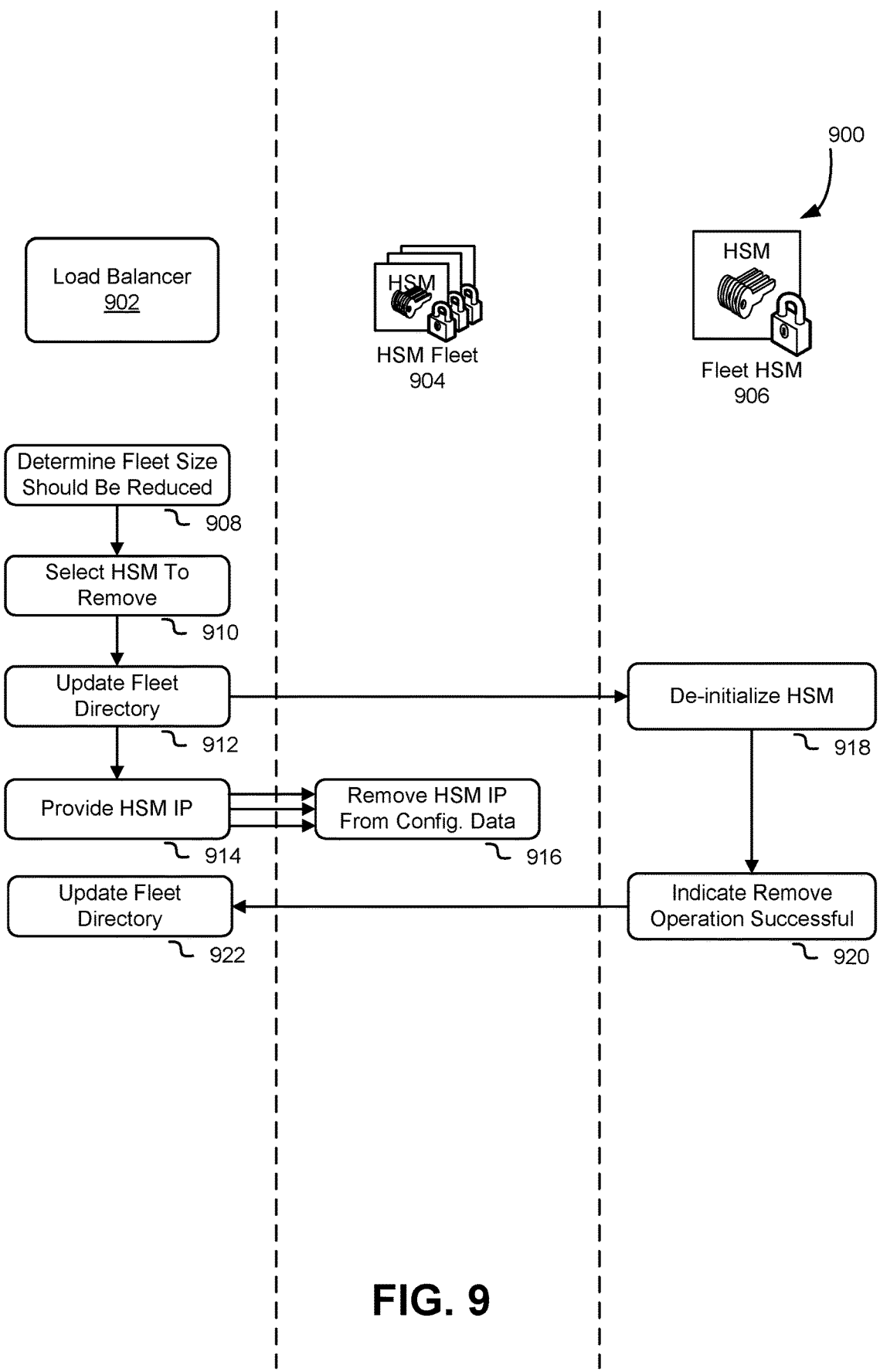
FIG. 9 shows a diagram illustrating the removal of an HSM from the fleet of HSMs of a virtual HSM.

FIG. 9 illustrates an environment in which various embodiments can be implemented. The computing environment 900 illustrates a process for scaling down a virtual HSM (e.g., removing an HSM from the fleet). The load balancer 902 of a virtual HSM may determine 908 that the fleet size should be reduced. The determination may be made in accordance with techniques described in this disclosure, for example, based on determining that the rate of incoming cryptographic requests is below a lower threshold. The load balancer may select 910 an HSM 906 to remove from the fleet of the virtual HSM and the load balancer may update 912 a fleet directory indicating that the selected HSM is in the process of being removed from the fleet. The load balancer may be further configured to not route requests to HSMs that are being removed from the fleet. In some embodiments, the fleet directory may instead be updated to indicate that the selected HSM has been removed from the fleet (as opposed to the removal being in progress). The selected HSM 906 may be de-initialized 918, for example, by erasing data such as key material from the HSM and removing all instance-specific key material such as the instance identity key and certificate and the instance application key and certificate. In some embodiments, the selected HSM 906 receives an indication that it should be removed from the fleet and performs the de-initialization in response to receiving that indication. The indication may be in the form of an API request, or may require one or more active steps by the selected HSM, such as sending a message to the load balancer to determine whether it should remain in the fleet.

The load balancer may provide 914 the network address of the HSM 906 to the fleet 904 of one or more HSMs in the virtual HSM. In some embodiments, a message with the network address may be sent to each HSM in the fleet (denoted by the multiple lines shown between 914 and 916). However, in other embodiments, a message with the network address may be sent to only one HSM in the fleet, or to a subset of the fleet. In such embodiments, a fleet synchronization mechanism may be used to propagate the network address of the HSM 906 to any HSMs in the fleet that did not receive the message. In some embodiments, at least one HSM in the fleet receives 916 the HSM 906 network address and removes information related to the HSM 906 from its configuration data as to indicate that the HSM 906 is no longer a part of the HSM fleet. The configuration data may, for example, include network addresses for some or all HSMs in the fleet.

In some embodiments, after the selected HSM 906 is de-initialized, the HSM 906 may indicate 920 that it was successfully removed from the fleet, for example, by providing an indication to the load balancer. The load balancer may update 922 its fleet directory to indicate that the removal was successful (e.g., by marking the HSM as removed in an entry of the fleet directory or by removing the entire entry associated with the HSM) and/or state information (e.g., updating from a "reduce" state to a "stable" state) by removing the HSM 906 from the load balancer's list of HSMs in fleet which may be used, for example, to route client requests. Additionally, it should be noted that while a load balancer is illustrated in FIG. 9 as performing some of the steps in connection with removing an HSM from the fleet, other components of the virtual HSM may perform the same or similar function.

Figure 10:
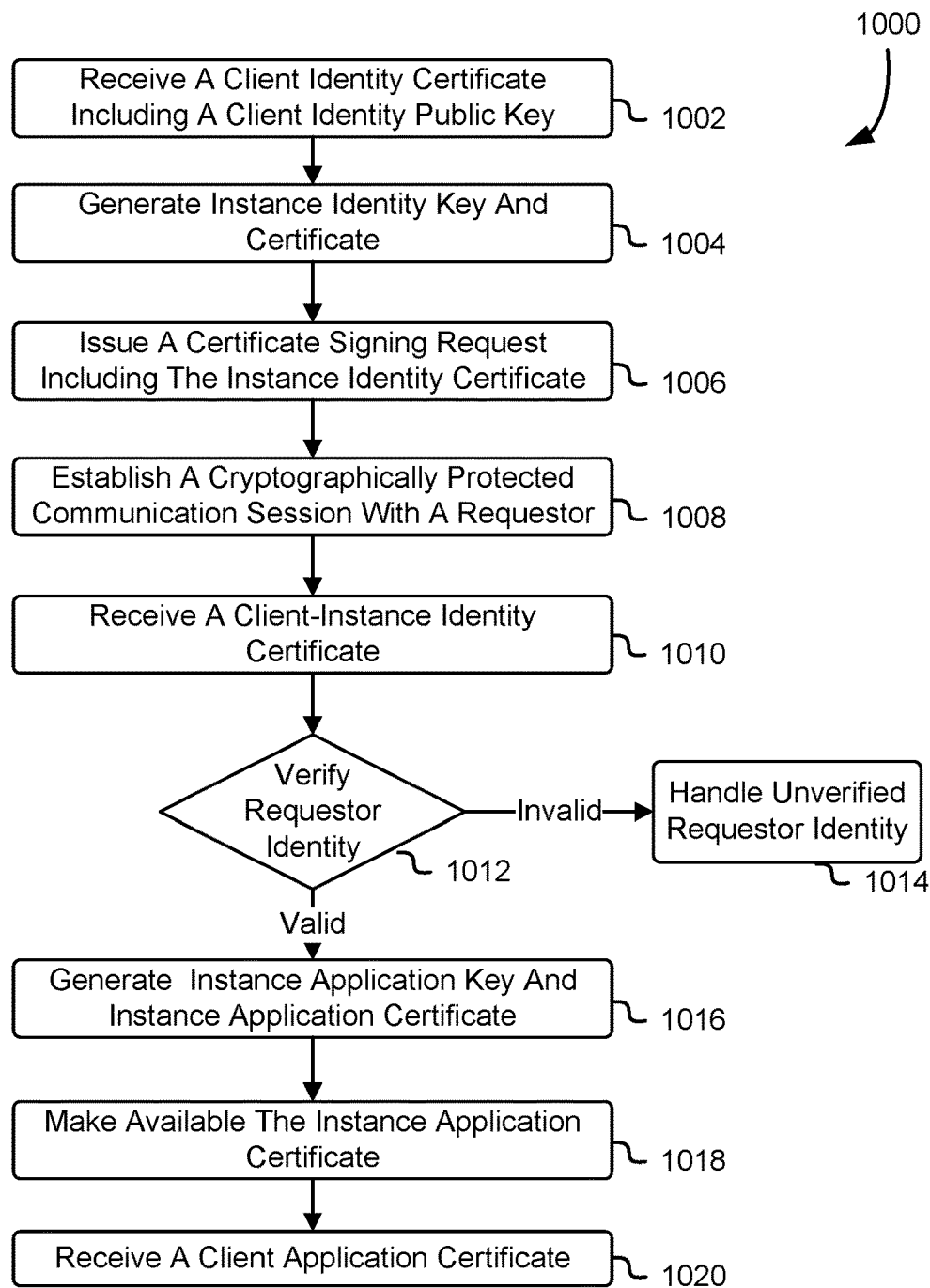
FIG. 10 shows an illustrative example of a process for initializing a virtual HSM.

FIG. 10 shows an illustrative example of a process 1000 that may be performed to initialize or provision a virtual HSM. Generally, the process 1000 may be performed by any system that is operable to function as a cryptographic module, such as a physical HSM, virtual HSM, and other cryptographic modules in which the system performing the process 1000 may require assurances that the module is authentic and/or authorized to perform the process (e.g., by establishing a chain of trust from the module to a trusted certificate authority). In an embodiment, the process 1000 includes receiving 1002, for example, as part of a request from a service provider, a client identity certificate that includes a client identity public key. In some embodiments, the system may generate 1004 or otherwise obtain an instance identity key and instance identity certificate such as those described above. The system may issue 1006 a certificate signing request that includes the instance identity certificate.

The digital certificates may be made available through various mechanism. In some embodiments, a digital certificate, such as the instance identity certificate, may be made available directly to a requestor by providing the certificate as part of a response to the request (e.g., in a plaintext or ciphertext format). In some embodiments, one or more certificates may be made available indirectly, such as by providing a response that includes a reference (e.g., a uniform resource identifier (URI), a uniform resource locator (URL)) to the certificate. Additionally, some or all of the certificates may be published, for example, to a service provider or certificate authority, which may be accessible to a requestor.

In some embodiments, the system establishes 1008 a cryptographically protected communication session with a requestor. The cryptographically protected communication session may further include information that indicates that the requestor purports to be the client corresponding to the client identity certificate. The cryptographically protected communication session may be a TLS session or other suitable cryptographically protected communication session described in this disclosure. The system may receive 1010, via the cryptographically protected communication session, a client-instance identity certificate. The system may then verify 1012 the requestor identity by using the client identity public key to verify a digital signature found on the client-instance identity certificate that is purportedly signed by the corresponding client identity private key and verifying the data content found in the client-instance identity certificate. If the digital signature is determined to be in invalid, the system may perform a work function to handle 1014 an unverified requestor identity. For example, the system may abort the request, refuse to fulfill the request, and/or terminate the cryptographically protected communication session immediately. In some embodiments, the system may notify a service provider that the requestor failed to verify its identity as that of the client.

After the digital signature is determined to be valid, the system may generate 1016 or obtain an instance application key and instance application certificate, for example, in the manner described above in this disclosure. The instance application certificate may be made available 1018 to the requestor. The system may receive 1020 a client application certificate via the cryptographically protected communication session. In some embodiments, the client may further verify a digital signature on the client allocation certificate using the client identity key that was previously received 1002.

Figure 11:
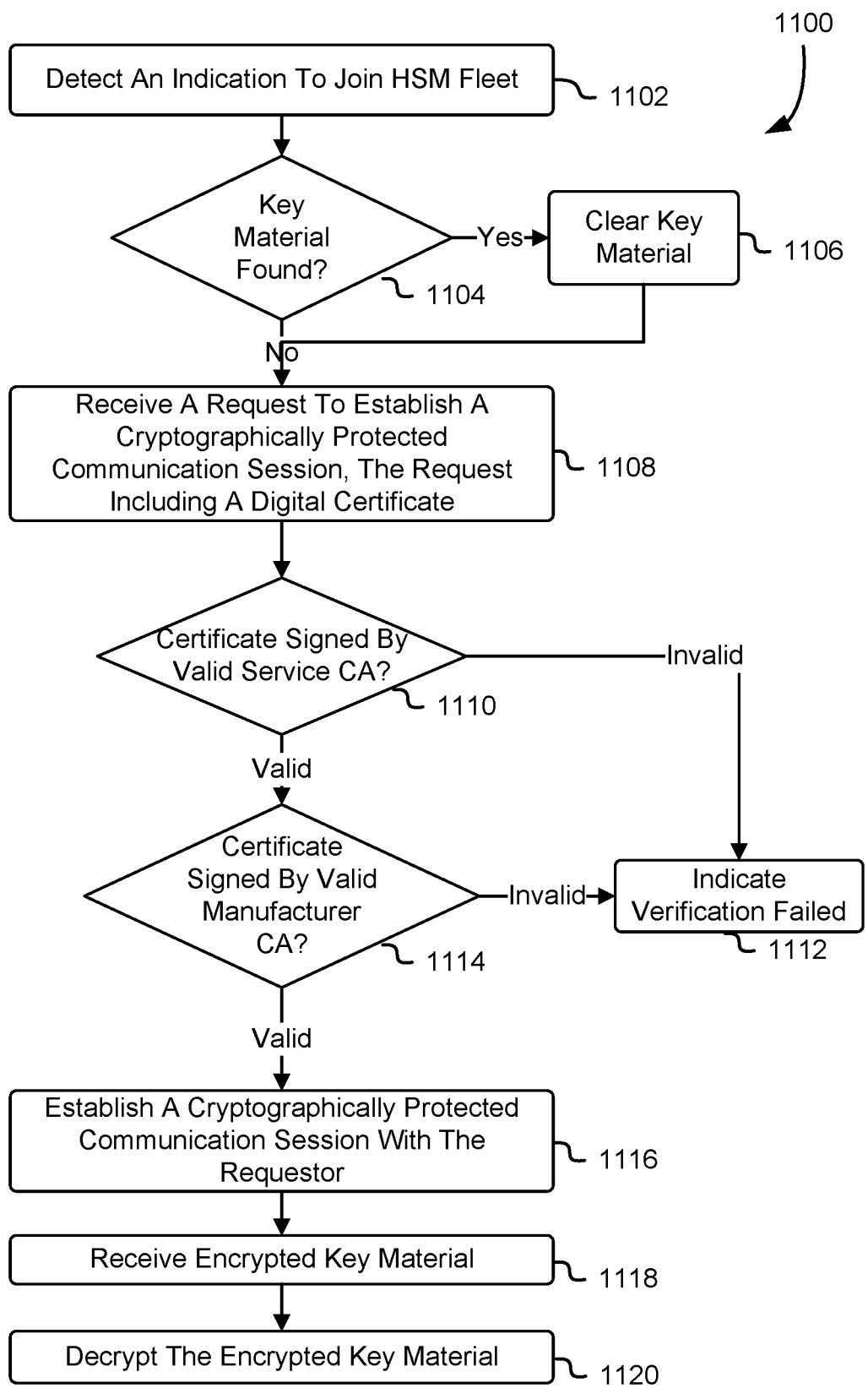
FIG. 11 shows an illustrative example of a process for adding a HSM to a virtual HSM.

FIG. 11 shows an illustrative example of a process 1100 that may be performed to add an HSM to the fleet of a virtual HSM. Generally, the process 1100 may be performed by any system that is operable to function as a cryptographic module, such as a physical HSM, virtual HSM, and the like. In an embodiment, the process 1100 includes detecting 1102 an indication to join an HSM fleet. The indication may be received, for example, from a load balancer of a virtual HSM or a service provider. In some embodiments, the HSM may detect that it should join an HSM fleet by issuing a heartbeat to a virtual HSM or service provider requesting an indication whether it should join a virtual and receiving a response indicating that it should join an HSM fleet. In some embodiments, the system, as part of a provisioning process, checks 1104 whether any unexpected key material exists on the system, for example, from a previous use. If unexpected key material was found, the system may clear 1106 (e.g., by setting all associated bits to zero) the key material. In some embodiments, the system may not check for pre-existing key material on the system—for example, where the key material is removed as part of a de-provisioning process. In some embodiments, the key material being checked for may exclude certain keys such as keys which are required for the system to operate—these keys may include the HSM manufacturer key and HSM service key.

The system may receive 1108 a request to establish a cryptographically protected communication session. The request may be made by an HSM in the fleet of a virtual HSM. As part of the request to establish the session, the system may receive a digital certificate that is signed, either directly or indirectly (e.g., verifiable via a chain of trust) by a service certificate authority and a manufacturer certificate authority. The system may verify 1110 that the certificate is signed by a valid service certificate authority. For example, the certificate may be signed by a HSM service key having the chain of trust described above in connection with FIG. 3. The system may also verify 1114 that the certificate is signed by a valid manufacturer certificate authority. For example, the certificate may also be signed by a HSM manufacturer key having a chain of trust described above in connection with FIG. 3. If either of these verifications is not successful, the system may indicate 1112 that the verification failed. The indication may include an indication that the certificate has not been verified to be from a component of the service and/or that the certificate has not been verified to be a component from the manufacturer.

The system may determine whether a digital certificate is valid by determining whether one or more digital signatures found on the certificate is authentic, whether the digital certificate is signed by a required signatory, and/or whether a chain of trust from the certificate to a trusted certificate authority is unbroken. Additionally, certificates that have expired, been revoked, been blacklisted, or known to be compromised may also be determined to be invalid.

The system may establish 1116, after verifying the certificate is valid, a cryptographically protected communication session that was requested 1108. The system may, as part of establishing the cryptographically protected communication session or thereafter, receive a cryptographic key such as a fleet transfer key that may be used for decrypting key material. The system may receive 1118 encrypted key material and decrypt 1120 the encrypted key material, for example, using the fleet transfer key.

Figure 12:
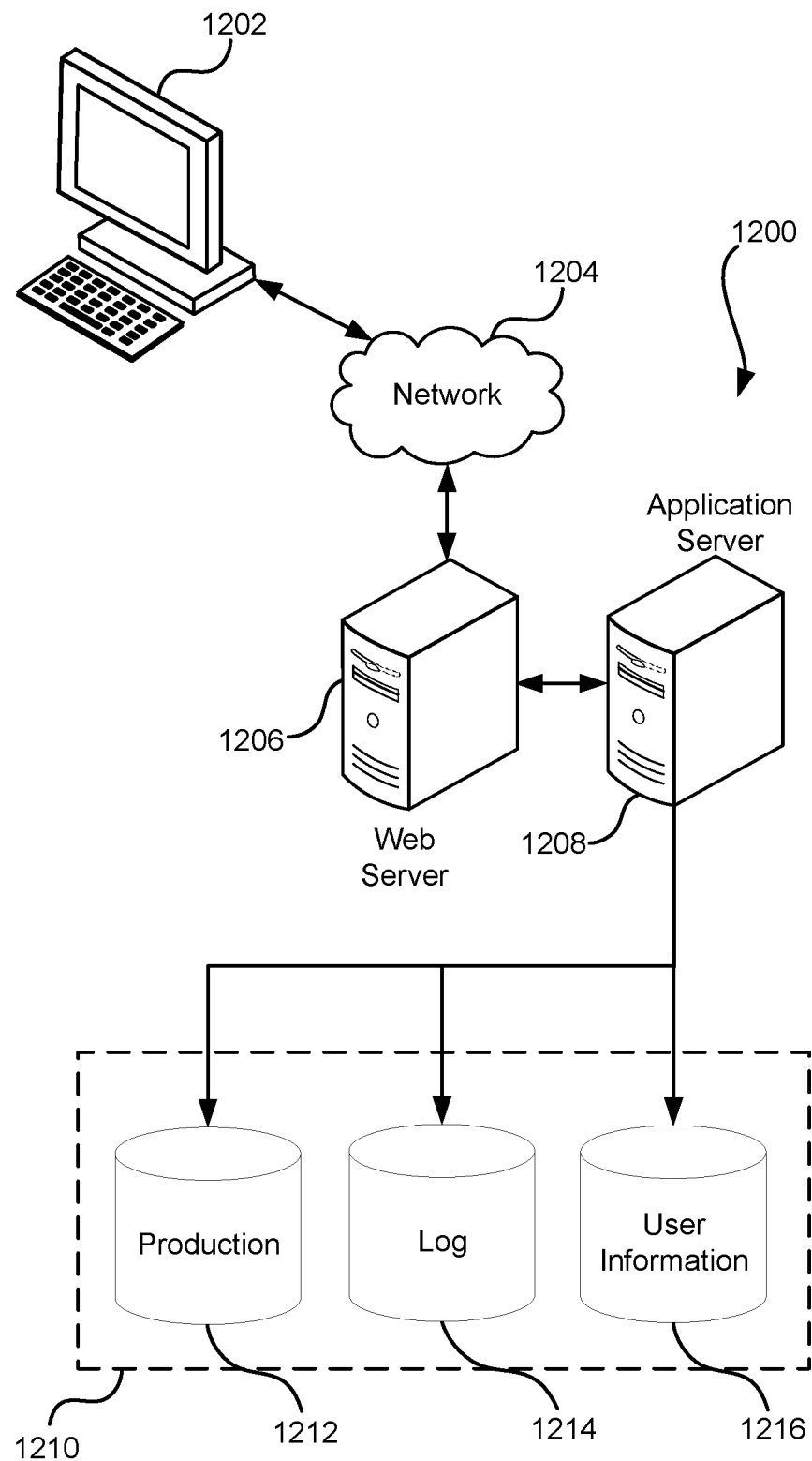
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a virtual cryptographic device, a message from a client computer device to establish a cryptographically protected communications session, the virtual cryptographic device backed by a plurality of physical cryptographic devices;
   selecting a first physical cryptographic device from the plurality of physical cryptographic devices to communicate over the cryptographically protected communications session;
   routing handshake messages between the client computing device and the first physical cryptographic device to establish the cryptographically protected communications session between the client computing device and the first physical cryptographic device, thereby allowing the first physical cryptographic device to provide a cryptographic secret for the cryptographically protected communications session to a second physical cryptographic device of the plurality of physical cryptographic devices; and
   distributing messages from the client computing device over the cryptographically protected communications session among physical cryptographic devices of the plurality of physical cryptographic devices that share the cryptographic secret.

2. The computer-implemented method of claim 1, wherein the computer-implemented method further comprises:
   obtaining a termination request to terminate the cryptographically protected communications session; and
   providing the termination request to the first physical cryptographic device, thereby allowing the first physical cryptographic device to delete the cryptographic secret and propagate instructions to the second physical cryptographic device to delete the cryptographic secret.

3. The computer-implemented method of claim 1, wherein distributing the messages from the client computing device over the cryptographically protected communications session among physical cryptographic devices of the plurality of physical cryptographic devices that share the cryptographic secret further comprises distributing a first message of the messages to the second physical cryptographic device.

4. The computer-implemented method of claim 3, wherein distributing the messages from the client computing device over the cryptographically protected communications session among physical cryptographic devices of the plurality of physical cryptographic devices that share the cryptographic secret further comprises distributing a second message of the messages to the first physical cryptographic device.

5. The computer-implemented method of claim 4, wherein distributing the first message and the second message is performed by a load balancer associated with the virtual hardware security module based at least in part on an availability associated with the first physical cryptographic device and the second physical cryptographic device.

6. The computer-implemented method of claim 1, wherein the message is a ClientHello message to establish a Transport Layer Security session.

7. A system, comprising:
   one or more processors; and
   memory storing executable instructions that, as a result of being executed, cause the system to:
      receive a request to establish a cryptographically protected communications session between a client and a virtual cryptographic device, the virtual cryptographic device supported by a set of cryptographic devices and a load balancer;
      provide a first message associated with the cryptographically protected communications session to a first cryptographic device of the plurality of cryptographic devices, thereby allowing the first cryptographic device to, in response to obtaining the first message, perform handshake operations to establish cryptographic information associated with the cryptographically protected communications session and provide the cryptographic information to a second cryptographic device of the plurality of cryptographic devices;
      as a result of the first cryptographic device and the second cryptographic device containing the cryptographic information, include the first cryptographic device and the second cryptographic device in the set of cryptographic devices supporting the virtual hardware security modules; and
      distribute messages from the client over the cryptographically protected communications session among cryptographic devices of the set of cryptographic devices.

8. The system of claim 7, where the load balancer is responsible for distributing the messages from the client over the cryptographically protected communications session among cryptographic devices of the set of cryptographic devices.

9. The system of claim 7, where the instructions that cause the system to distribute the messages from the client over the cryptographically protected communications session among cryptographic devices of the set of cryptographic devices further include instructions that, as a result of being executed, cause the system to distribute the messages based at least in part on availability associated with members of the set of cryptographic devices.

10. The system of claim 7, where the memory further includes instructions that, as a result of being executed, cause the system to:
    obtain a request to terminate the cryptographically protected communications session; and
    cause the set of cryptographic devices to destroy the secret.

11. The system of claim 10, where the instructions that cause the set of cryptographic devices to destroy the secret further include instructions that, as a result of being executed, cause the first cryptographic device to propagate instructions to a subset of cryptographic devices of the set of cryptographic devices to destroy the secret.

12. The system of claim 7, where the cryptographically protected communications session is a Transport Layer Security session.

13. A non-transitory computer-readable storage medium storing executable instructions that, as a result of execution by one or more processors of a computer system, cause the computer system to at least:

establish a cryptographically protected communication channel between a client and a virtual security device backed by a plurality of physical security devices, the cryptographically protected communication channel provided by at least:
  routing a first message obtained from the client to a first physical security device of the plurality of physical security devices, the first message including a request to establish the cryptographically protected communication channel;
  routing to the client a second message generated by the first physical security device, the second message including at least a cryptographic certificate; and
  providing a cryptographic secret generated by the client based at least in part on the cryptographic certificate to the first physical security device thereby causing the first physical security device to distribute the cryptographic secret to members of the plurality of physical security devices; and
distribute messages from the client over the cryptographically protected communications session among the member of the plurality of physical security devices that share the cryptographic secret.

14. The non-transitory computer-readable storage medium of claim 13, wherein the cryptographically protected communication channel is a Secure Sockets Layer (SSL) connection.

15. The non-transitory computer-readable storage medium of claim 13, wherein the instructions that cause the computer system to distribute the messages further include instructions that, as a result of execution by the one or more processors, cause the computer system to distribute the messages based at least in part on an availability associated with the member of the plurality of physical security devices.

16. The non-transitory computer-readable storage medium of claim 13, wherein the cryptographic secret is encrypted with a private key associated with the client; and wherein the instructions further include instructions that, as a result of execution by the one or more processors, cause the computer system to provide a client certificate obtained from the client to the first physical security device, the client certificate including a public key associated with the client.

17. The non-transitory computer-readable storage medium of claim 13, wherein the instructions further include instructions that, as a result of execution by the one or more processors, cause the computer system to:
  obtain a request to terminate the cryptographically protected communication channel; and
  cause a second physical security device of the plurality of physical security devices to distribute instructions to the members of the plurality of physical security devices to delete the cryptographic secret.

18. The non-transitory computer-readable storage medium of claim 13, wherein the instructions further include instructions that, as a result of execution by the one or more processors, cause the computer system to associate the members of the plurality of physical security devices with the virtual security device.

19. The non-transitory computer-readable storage medium of claim 18, wherein the instructions further include instructions that, as a result of execution by the one or more processors, cause the computer system to generate a determination to remove the first physical security device from the members of the plurality of physical security devices based at least in part on a utilization level associated with the virtual security device.

20. The non-transitory computer-readable storage medium of claim 19, wherein the instructions further include instructions that, as a result of execution by the one or more processors, cause the computer system to, in response to the determination, cause the first physical security device to delete the cryptographic secret.

* * * * *